United States Patent
Smits

(10) Patent No.: US 8,430,512 B2
(45) Date of Patent: Apr. 30, 2013

(54) PHOTONJET SCANNER PROJECTOR

(76) Inventor: Gerard Dirk Smits, Los Gatos, CA (US)

( * ) Notice: Subject to any disclaimer, the term of this patent is extended or adjusted under 35 U.S.C. 154(b) by 0 days.

(21) Appl. No.: 13/605,948

(22) Filed: Sep. 6, 2012

(65) Prior Publication Data

US 2013/0003081 A1     Jan. 3, 2013

Related U.S. Application Data

(63) Continuation of application No. 12/249,899, filed on Oct. 10, 2008, now Pat. No. 8,282, 222.

(60) Provisional application No. 60/998,520, filed on Oct. 10, 2007, provisional application No. 61/000,238, filed on Oct. 23, 2007, provisional application No. 61/002,402, filed on Nov. 7, 2007, provisional application No. 61/005,858, filed on Dec. 7, 2007.

(51) Int. Cl.
*G03B 21/20*     (2006.01)

(52) U.S. Cl.
USPC ............................................................ 353/85

(58) Field of Classification Search ............... 353/30, 353/37, 50, 85–87, 98, 47, 94; 359/196.1, 359/197.1, 212.1–212.2, 213.1, 214.1, 215.1, 359/220.1, 221.1; 372/29.01, 29.014
See application file for complete search history.

(56) References Cited

U.S. PATENT DOCUMENTS

| | | |
|---|---|---|
| 5,052,820 A | 10/1991 | McGinniss et al. |
| 5,559,322 A | 9/1996 | Jacoby et al. |
| 5,580,140 A | 12/1996 | Katz et al. |
| 6,670,603 B2 * | 12/2003 | Shimada et al. .............. 250/235 |
| 6,982,683 B2 | 1/2006 | Stanton |
| 7,144,117 B2 | 12/2006 | Kojima |

(Continued)

FOREIGN PATENT DOCUMENTS

| | | |
|---|---|---|
| JP | 11119184 A | 4/1999 |
| JP | 2003029201 A | 1/2003 |
| WO | 2006063577 A1 | 6/2006 |

OTHER PUBLICATIONS

European Search Report for European Patent Application No. 08837063.0 mailed Nov. 19, 2010.

(Continued)

*Primary Examiner* — Tony Ko
*Assistant Examiner* — Jori S Reilly-Diakun
(74) *Attorney, Agent, or Firm* — Frommer Lawrence & Haug LLP; Matthew M. Gaffney

(57) ABSTRACT

An image projection device for displaying an image onto a remote surface. The image projection device employs a scanner to project image beams of visible light and tracer beams of light onto a remote surface to form a display of the image. The device also employs a light detector to sense at least the reflections of light from the tracer beam pulses incident on the remote surface. The device employs the sensed tracer beam light pulses to predict the trajectory of subsequent image beam light pulses and tracer beam light pulses that form a display of the image on the remote surface in a pseudo random pattern. The trajectory of the projected image beam light pulses can be predicted so that the image is displayed from a point of view that can be selected by, or automatically adjusted for, a viewer of the displayed image.

1 Claim, 11 Drawing Sheets

U.S. PATENT DOCUMENTS

| | | | |
|---|---|---|---|
| 7,262,765 B2 | 8/2007 | Brown et al. | |
| 7,303,289 B2 * | 12/2007 | Fujiwara | 353/101 |
| 7,911,444 B2 | 3/2011 | Yee | |
| 8,282,222 B2 * | 10/2012 | Smits | 353/85 |
| 2002/0067466 A1 | 6/2002 | Covannon et al. | |
| 2003/0010888 A1 | 1/2003 | Shimada et al. | |
| 2003/0045034 A1 | 3/2003 | Davis et al. | |
| 2003/0202234 A1 | 10/2003 | Taylor et al. | |
| 2004/0218155 A1 | 11/2004 | Schenk et al. | |
| 2005/0035943 A1 | 2/2005 | Kojima | |
| 2005/0052635 A1 | 3/2005 | Xie et al. | |
| 2005/0099664 A1 | 5/2005 | Yamaoka | |
| 2006/0028622 A1 | 2/2006 | Nojima et al. | |
| 2008/0317077 A1 | 12/2008 | Hoving et al. | |
| 2009/0096994 A1 | 4/2009 | Smits | |
| 2010/0002154 A1 | 1/2010 | Hua | |

OTHER PUBLICATIONS

International Search Report and Written Opinion in International Patent Application No. PCT/US2008/079663 mailed Apr. 30, 2009.

International Search Report and Written Opinion in International Patent Application No. PCT/US2011/026691 mailed Oct. 24, 2011.

International Search Report in International Patent Application No. PCT/US2011/054751 mailed Jan. 30, 2012.

International Preliminary Report on Patentability in International Patent Application No. PCT/US2008/079663 mailed Jan. 25, 2010.

Communication Pursuant to Article 94(3) EPC in European Patent Application No. 08837063.0 mailed Oct. 22, 2012.

Communication Pursuant to Article 94(3) EPC in European Patent Application No. 08837063.0 mailed Dec. 27, 2011.

* cited by examiner

PHOTONJET SCANNER PROJECTOR

CROSS-REFERENCE TO RELATED APPLICATIONS

This application is a Continuation application of U.S. Non-Provisional Application, filled "IMAGE PROJECTOR WHIR REFLECTED LIGHT TRACKING," Ser. No 12/249,899, filed Oct. 10, 2008; which claims the benefit of U.S. Provisional Application, titled "NOVEL PROJECTION SYSTEM USING A HIGH-SPEED PSEUDORANDOM SWEEPING LIGHT BEAM," Ser. No. 60/998,520, filed on Oct. 10, 2007, U.S. Provisional Application, titled "PHOTONJET SCANNER-PROJECTOR," Ser. No. 61/000,238, filed on Oct. 23, 2007, U.S. Provisional Application, titled "PHOTONJET TRACKING CAMERA," Ser. No. 61/002,402, tiled on Nov. 7, 2007, and U.S. Provisional Application, titled "PHOTONJET SCANNER-PROJECTOR SYSTEM," Ser. No. 61/005,858, filed on Dec. 7, 2007, the benefit of the earlier filing dates of which is hereby claimed under 35 U.S.C. §119(e) and the contents of which are further incorporated by reference in their entirety.

TECHNICAL FIELD

The present disclosure is directed to an image projector in general, and more particularly, to an image projector that employs observed reflection of light beams to predict the subsequent position of light beams that display the image on a remote surface.

BACKGROUND

With the ubiquity of images that are available for display by an electronic device, the capabilities of a particular electronic device's display has become a significant factor to users. These images can include, movies, videos, podcasts, television, pictures, cartoons, illustrations, graphics, tables, charts, presentations, and the like. Also, the quality, resolution, and type of display for images that can be displayed by an electronic device is often the primary factor in a user's decision to purchase that particular electronic device. For example, users' might prefer relatively low power projection displays for mobile devices, such as mobile telephones, notebook computers, hand held video game consoles, hand held movie players, personal digital assistants (PDA), and the like. These low power projection displays can include, and backlit or non-backlit Liquid Crystal Displays (LCD). Further, other relatively low power emissive displays such as Organic Light Emitting Diodes (OLED), are growing in popularity for mobile devices. Also, the size of a display for a mobile device is often limited to a relatively small area, i.e., displays that can easily fit in a hand or clothing pocket. The relatively small size of displays for many mobile devices can also limit their usability for sonic applications.

Stationary electronic devices, such as personal computers, televisions, monitors, and video game consoles, often employ high power projection display technologies, such as Gas Plasma, Cathode Ray Tubes (CRT), LCD, DLPs (Digital Light Processor), and the like. Also, displays for these relatively stationary electronic devices are often considerably larger than those displays employed with mobile devices, e.g., projection displays can be five feet across or more. However, the relatively large physical size of the cabinetry associated with most displays employed with stationary devices can be inconvenient and unattractive for many users, especially when the displays are not in use.

Front image projection devices can also be used to display images on a remote surface, e.g., a hanging screen of reflective fabric, or some other relatively vertical and reflective surface such as a wall. Also, a variety of different technologies are employed by front image projection devices, such as Digital Light Processors (DLP), Light Emitting Diodes (LED), Cathode Ray Tubes (CRT), Liquid Crystal Displays (LCD), Liquid Crystal on Silicon (LCoS), MicroElectroMechanicalSystems (MEMS) scanners, and the like. However, artifacts in the display of images projected on remote surfaces have been difficult to compensate for, and often adversely effect the quality, resolution, and usability of these remotely projected images.

BRIEF DESCRIPTION OF THE DRAWINGS

Non-limiting and non-exhaustive embodiments of the present invention are described in reference to the following drawings. In the drawings, like reference numerals refer to like parts through all the various figures unless otherwise explicit.

For a better understanding of the present disclosure, a reference will be made to the following detailed description, which is to be read in association with the accompanying drawings, wherein.

DESCRIPTION OF THE EMBODIMENTS

Figure 1:
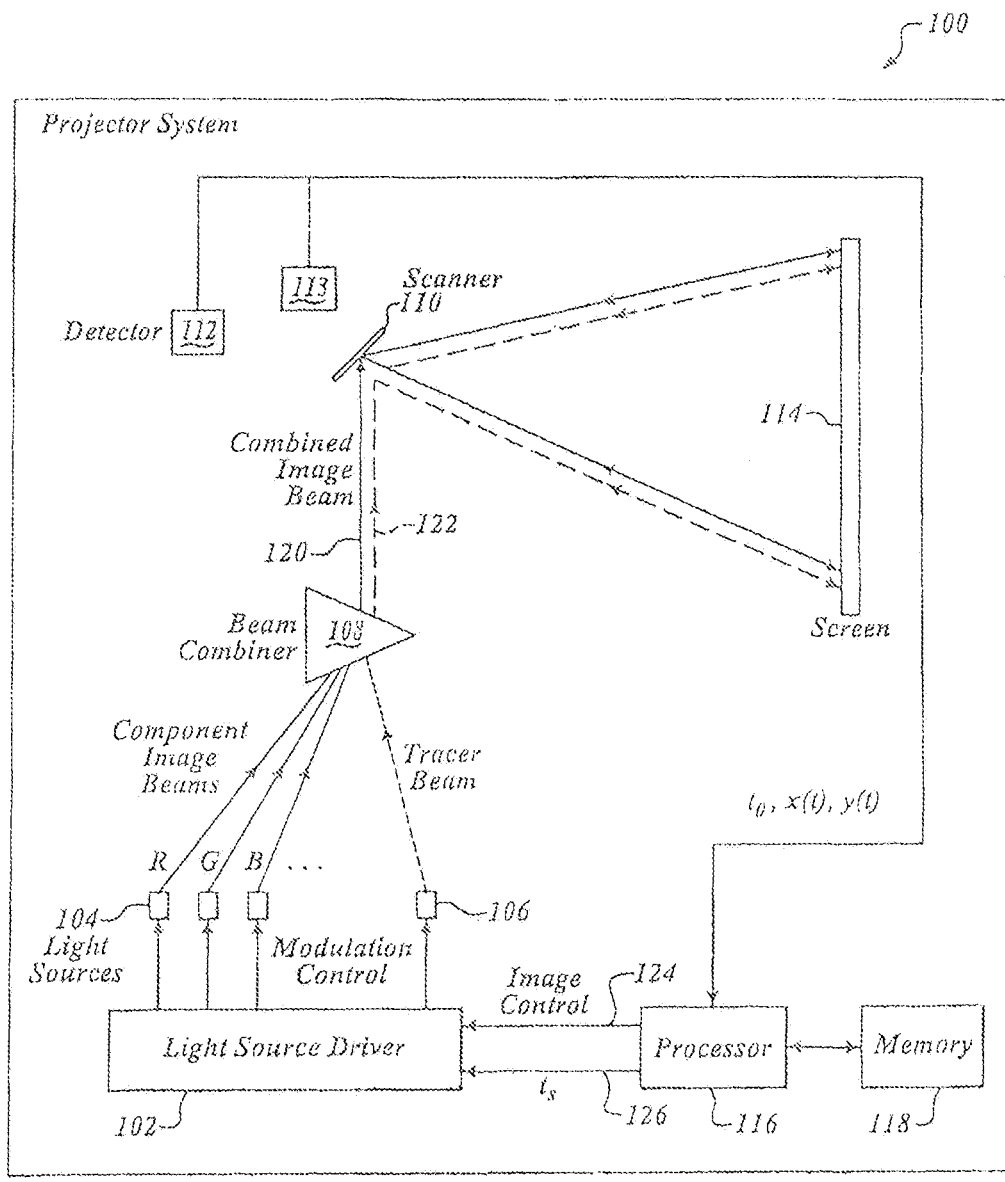
FIG. 1 is a block diagram of one embodiment of a Image Projector Device (IPD)

The present disclosure will now be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices.

Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "pseudorandom" as used herein, indicates a statistically random process, which appears to be random as distinguished from a truly random process, which lacks predictability. Pseudorandom processes may be generated using some deterministic elements combined with some non-repeating patterns. For example, a timestamp may be combined with the changing contents of a predetermined memory location to generate a pseudorandom number. Furthermore, this term as used herein, indicates lack of a predefined scanning organization, for example, an array of pixels (picture elements), parallel scanlines, or any other arrangement having a temporal or spatial relationship between scanlines.

The term "corresponding" as used herein, may indicate a one-to-one, one-to-many, or many-to-one, mapping. For example, an image pixel corresponding to a display position may indicate that the image pixel corresponds to more than one display position, when adjacent display positions are resolvable at a higher resolution in comparison with the resolution of the image associated with the image pixel. In such a case, a single image pixel may be interpolated or resolved to cover more than one display position, and thus, the single image pixel corresponds to more that one display position and indicates a one-to-many mapping. In another case where the image pixels and the display positions have substantially equal resolutions, the correspondence there between can be a one-to-one mapping. Furthermore, if a plurality of adjacent pixels have substantially equal values, they may be projected as a line to form the image instead of a series of individual positions on a display.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly described, the invention is directed to an image projection device for displaying an image onto a remote surface. The image projection device employs a scanner to project image beams of visible light and tracer beams of light onto a remote surface to form a display of the image. The device also employs a light detector to sense at least the reflections of light from the tracer beams incident on the remote surface. The device employs the sensed tracer beam light to predict the trajectory of the beam and subsequent image beams that form a display of the image on the remote surface. Additionally, in at least one embodiment, the light detector can also sense the reflections of visible light that form the projected image incident on the remote surface. And the device can employ the sensed reflections of this visible light to effect adjustments to subsequent image beams that form the display of the image on the remote surface.

The trajectory of the projected image beams can be observed so that the image is displayed from a point of view that can be selected by, or automatically adjusted for, a viewer of the displayed image. Also, the image beams and tracer beams that form the projected image can be projected onto the remote surface in a pseudo random pattern that is primarily based on the projected image itself rather than a predefined pattern, such as an array or grid.

To display the projected image on a remote surface, the image projection device projects pulses of visible light onto the remote surface and also projects other pulses of tracer beam light onto the same remote surface. These pulses can be generated by modulating the output of light sources or shuttering the detector of the reflected light from the remote surface. The light from the image beam and the tracer beam can be combined and projected onto the same location at the remote surface, or they may be projected onto two adjacent locations where the distance between the two locations is predetermined. The image beam light typically has a wavelength in the visible spectrum. Also, the tracer beam light can have a wavelength in either the visible wavelength or another wavelength in the visible light spectrum. If visible light is employed for the tracer beam pulses, the frequency of the pulses is typically so fast that the tracer beam pulses are undetectable to the typical viewer. Also, if non-visible light is employed for the tracer beam pulses, the light wavelength can be in one or more non-visible spectrums, e.g., infrared, ultraviolet, or the like.

Furthermore, in at least one embodiment, the image projection device enables one or more safety interlocks between the image projection device and the remote surface. For example, a determination is made as to whether or not the scanner is properly moving, and if not, the image beam pulses and tracer beam pulses are disabled until the scanner is properly moving again. Also in at least one embodiment, if a moving object is detected between the image projection device and the projection of the image on the remote surface, the image beam pulses and tracer beam pulses are disabled until the moving object is no longer present.

In at least one embodiment, the tracer beam non-visible light pulses are IR (Infra-Red) light that is projected by a scanner, such as an oscillating MEMS scanner, onto particular positions in a pseudorandom scanline trajectory that sweeps across the remote surface. A light detector, such as a camera, coupled with a processing unit, tracks the tracer beam light pulses to obtain data for detecting N consecutive preceding positions of the pseudorandom scanline trajectory and estimating the subsequent consecutive M positions of the scanline trajectory with respect to a current screen position. Multiple component image beams of visible light, for example, RGB (Red-Green-Blue) colors, are modulated, based on a corresponding M pixels of an image in a memory (memory image), and combined to create discrete combined image beam pulses. The combined image beam pulses are projected onto the remote surface at the subsequent estimated positions after the current combined image beam position. Furthermore, the reflections of the projected combined image beams incident on the remote surface, in addition to the tracer beam, may be optionally detected and compared with a copy of the image in a memory. And based on that comparison, the subsequent estimated positions of the projected image beams can be adjusted on subsequent pseudorandom sweeps, progressively, to improve the projected image's sharpness, brightness, and color. The combined image beam may also include information about a known image to be displayed.

For hundreds of millions of users using billions of computing devices, the availability of a physically small, low-power, high-quality, high reliability, high resolution projection display with few or no visual artifacts may provide a significant advantage. These advantages may be particularly significant for devices with small displays, such as mobile phones and PDA's. With a small, low-power, built-in micro projector, such small computing devices can display information, effectively, on a large, high-resolution screen without the large physical size and high power consumption rate normally associated with a large screen.

Power efficiency is also very important, particularly for small personal devices, because of the limited battery life with daily use. Efficient projection of light with limited use of filters, polarizers, and the like, reduces overall power consumption, while providing a high quality display. The mixing of light falls into at least two general categories: additive mixing and subtractive mixing. In additive mixing, component light signals are combined with each other. In subtractive mixing, some light frequency components are filtered out, transmissively or reflectively, or subtracted from the original whole. Some of the conventional display technologies, such as LCD and DLP, use subtractive mixing as a basic part of their operation. Subtractive mixing of light beams is generally wasteful of energy because light (photons) is first generated and then partially blocked (subtracted), wasting the already generated light. Subtractive mixing is used to increase image brightness and enhance contrast between the brightest and darkest pixels. In display systems that use subtractive mixing, often just five percent (5%) of the energy used to generate the light is eventually utilized for displaying the image, resulting in poor overall efficiency.

Another important aspect of a display technology is reliability. With few moving parts, low power consumption, and low heat generation, reliability of invention may be generally greater compared to other display technologies having similar quality.

The feedback aspects, for both tracer pulses and image beam, of the invention enables uses in applications that are not possible, or are more difficult to realize, with other technologies. For example, the invention allows automatic adjustment of a display in real-time based on a perspective/position of the viewer/user. The user may move around a remote display screen while the invention automatically adjusts the displayed image to provide the appropriate perspective as viewed from each new position of the user with respect to the direction of projection onto the screen. This feature may have uses in immersive applications, such as video games. A variation of this capability is that the projected image may be displayed on an un-even surface of a screen, such as a textured wall, fabric, or other background with texture or curvatures that would otherwise distort the projected image. These features are more fully described below with respect to FIGS. 3-7.

Even though various embodiments refer to the RGB color space, other color spaces may also be used. For example, YIQ, YUV, YCbCr, and the like, color spaces may also be used to provide an image for projection. Similarly, more than three basic colors may be used. For example, in addition to the Red Green Blue color sources, other emissive spectral component color sources may be used, such as an Orange color source, for example, in the wavelength range of 597 to 622 nanometers (nm), a Yellow color source, for example, in the wavelength range of 577 to 597 nm, or a Violet color source, for example, in the wavelength range of 380 to 455 nm. In this way, four or more component color sources may be used to project the image on a remote surface.

Generally, use of additional component colors may remove some tradeoffs, for example, the tradeoffs between efficiency, efficacy (characterized as perceived lumens per watt), gamut (broadest color range), and fidelity, characterized by avoidance of perceptive artifacts, such as spatial, temporal, motion, or color artifacts. Such tradeoffs may have to be made in both spatially rasterized and field-sequential color display systems, like LCDs, having addressable display elements or pixels. The use of a greater number of coherent monochrome sources, such as laser beams, reduce speckle that may be caused by self-interference in the reflected beam of each component light beam. The greater number of component light beams may reduce speckle because the component light beams are not coherent with respect to each other and may cancel out Multiple component light sources of substantially identical wavelength may also be used for added peak power and efficiency. For example, multiple semiconductor light sources, such as LEDs and laser LEDs, may be optically combined to generate a brighter and more efficient light beam. Speckle may be reduced due to reduced phase coherency in such "gang source" systems where multiple near-identical wavelength component light sources are used.

Illustrative Operating Environment

Electronic displays for computing devices, such as workstations, desktop and laptop Personal Computers (PC), mobile devices like mobile phones, PDAs, and the like, as well as displays for entertainment-oriented devices, such as televisions (TV), DVD players, and the like, may be replaced or supplemented by image projection device (IPD). In one embodiment, the IPD is an integral part of the computing or entertainment device. In another embodiment, the IPD may be a supplemental external display device used in addition to, or in place of a conventional display.

One embodiment of a computing device usable with the IPD is described in more detail below in conjunction with FIG. 2. Briefly, however, the computing device may virtually be any stationary or mobile computing device capable of processing and displaying data and information. Such devices include mobile devices such as, cellular/mobile telephones, smart phones, display pagers, radio frequency (RF) devices, infrared (IR) devices, PDAs, handheld computers, laptop computers, wearable computers, tablet computers, mobile video game consoles, integrated devices combining one or more of the preceding devices, or the like. Stationary computing devices may also include virtually any computing device that typically connects using a wired or wired communications medium such as personal computers, video game consoles, multiprocessor systems, microprocessor-based or programmable consumer electronics, network PCs, or the like.

Computing devices typically range widely in terms of capabilities and features. For example, a mobile phone may have a numeric keypad and a few lines of an LCD or OLED display on which a small amount of text and graphics may be displayed. In another example, a computing device may have a touch sensitive screen, a stylus, and a relatively large display in which both text and graphics may be displayed.

A computing device may include a browser application that is configured to send/receive and display web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Communication media used with computing devices typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

The display of images and/or video data using the IPD is different from the display of the same images/video on more conventional displays. Conventional displays generally are arranged with some form of pixel addressing in the display area. The pixel address may be specified by timing, as in raster scanners like CRTs using horizontal and vertical blanking signals (H-sync and V-sync, respectively), or by row-column address pairs like transistor/LED (Light Emitting Diode) arrays in LCDs. In conventional displays, the area of the display is generally quantized as a fixed grid with equal sized tiles or spatial quanta, also referred to as pixels. In such display systems, the illusion of motion is created by quantizing continuous time into discrete and equal quanta, also referred to as frames. Generally, a fixed frame rate, expressed as Frames Per Second (FPS) is used to record and play back moving images. This quantization of time into frames, and image into pixels, introduce temporal and spatial artificial visual artifacts, respectively, dining the display of moving images, such as jagged lines (spatial), aliasing (spatial and temporal), image blurring (temporal), judder (temporal), and the like, further described below.

These address-based pixel organizations are fundamentally different from the pseudo random scanning method used in IPD. The address-based displays generally require a defined frame format with specific and rigid timing requirements, as is well known to one skilled in the relevant arts. For example, in a raster scanner, scanned lines (scanlines) are displayed in consecutive order, as parallel horizontal lines, one after another from the top to the bottom of the screen. In contrast, the MEMS scanner for the IPD can oscillate and project light in a pseudorandom pattern onto a remote surface, where the scanlines of image beam and tracer beam light pulses are primarily traced out in a direction based on the image to be projected, without relying upon a particular spatial or temporal relationship with the previous or the next scanline.

Conventional scan patterns, in terms of both timing and spatial regularity, digital sampling, and quantization in general create a number of visual artifacts, such as jagged slant or diagonal lines, especially visible in low-resolution displays, image blurring, motion blur (may occur because of a basic mismatch between continuous human vision and quantized digital display), judder (defined as small unnatural jerky movements in motion pictures, either in space or in time. In space, judder can be the result of consecutive film frames not advanced precisely to the same position at the projector gate. In time, judder in video may be noticed because 24 frames per second for film source does not divide evenly into 60 fields or frames per second for NTSC video, and some film frames' content is shown on the screen for more time than other frames' content), moirés (pattern resulting from two grids that are superimposed over one another), screen door effects, abasing, and the like. These artifacts results, in one way or another, from quantization and digital sampling.

However, since the IPD is relatively analog in nature and in its operation as compared to conventional displays, does not depend on quantization, even though at some points through the process a IPD implementation can process digital data. For example, reading an image from memory to display may involve some digital processing, however, once the image is ready for projection using IPD, the process is largely analog, as more fully described herein.

Another difference between the IPD and conventional displays is tracking and feedback. Conventional displays are feed-forward in their basic operation, sending image data in one direction: from the source of the image, for example, memory or DVD, to the destination, which is the display device. Generally, no feedback is needed for basic operation and no data is read back from the conventional display. In some implementations of conventional display devices, the displayed image may be read back or sensed and compared with the source image to increase the quality of the displayed image. However, such feedback is for quality enhancement as opposed to being part of the basic operation of the conventional display devices. The display method used in IPD may use feedback from the tracer beam, for example, IR pulses, to determine the next screen position on the scanline trajectory by trajectory prediction and/or estimation. Once the next screen position is so predicted, the memory image for the corresponding screen position is obtained and used to modulate the component image beams for combining and projecting onto the next screen position.

Because the scanlines can be pseudorandom in the IPD, generally, the timing information (usually included in video frames) needed for display of a video stream on a conventional display device, may not be needed for display of the same video stream on the IPD. In one embodiment, the active video signal, the sequence of images to be displayed, that is sent to a conventional display screen, may be stripped, in real-time, from the formatting information associated with the conventional displays, such as H-sync and V-sync signals and/or other timing information, for display using IPD. In another embodiment, the active video or other image to be displayed using IPD may be generated for IPD or pre-stripped at the source of the video or image. In yet another embodiment, both of the above embodiments may be implemented by dynamically determining whether an image has display format information or is pre-stripped. In still another embodiment, the timing information included in video frames may be used to extract information that may be used to improve quality and/or perceived resolution. For example, a weighted average of multiple frames may be used to insert precise interpolated inter-frame pixel values that reduce unwanted visual artifacts.

Many graphics programs, such as video games and programs for 3-D (three Dimensional) manipulation of objects, may generated images with effective resolutions that are significantly beyond the resolutions that can be displayed by conventional display devices. Such high resolution graphics generated by these graphics programs may specially benefit from a projection system, such as the PSTP, that is substantially free from quantization effects and has very high effective resolution.

FIG. 1 is a block diagram of one embodiment of IPD 100. This embodiment includes a light source driver 102 for modulating component image beams, generated by light sources 104, and for controlling tracer beam generator 106. The component image beams are combined using a beam combiner 108 that produces a combined image beam 120. The combined image beam is directed to a scanner 110, which reflects the combined image beam to a screen 114. Combined image beam 120 includes information about a known image to be displayed. The information about the known image is projected sequentially (serially) onto screen 114 using the consecutive projected scanlines causing the known image to appear on screen 114. The formation of the known image on the screen may take a few microseconds or less.

Tracer beam 122 used for scanline trajectory prediction is also directed to scanner 110 and reflected to screen 114. Detector 112 is used to detect the reflection of the tracer beam off screen 114. Detector 112 sends timing $t_0$ and screen position information [x, y] to processor 116 coupled with memory 118 holding an image to be displayed on screen 114. Detector 112 can also be used to optionally detect the reflection of the image beam off screen 114. Additionally, in at least one embodiment, a separate detector 113 can be included to separately detect the reflection of the image beam off screen 114. Process 116 is also couple with light source driver 102 to control the modulation of component image beams, and generation of tracer beam 122 by tracer beam generator 106.

In one embodiment, component light sources 104 include RGB. In another embodiment, component light sources 104 may include other color components such as orange, yellow and violet in addition to RGB. In one embodiment light sources 104 are LEDs (Light Emitting Diode), while in another embodiment, light sources 104 are lasers, in yet another embodiment, light sources 104 are laser diodes. Those skilled in the relevant arts will appreciate that many types of light sources may be used to generate component lights, such as red, green, and blue, and the like, without departing from the spirit of the disclosure.

Component light sources 104 produce component image light beams that are combined by a beam combiner 108 to produce a combined image beam. In one embodiment the beam combiner 108 is an optical device, such as a prism, dichroic mirrors, or the like. In another embodiment, the beam combiner 108 is an electronic device that may be used to convert light components into electrical signals, mix the electrical signals into a mixed signal, and convert the mixed signal back into a combined image beam. An electronic mixer may be used if intermediate processing of the light beam, such as digital or analog filtering or other control and processing, is desired.

In one embodiment, scanner 110 may be a MEMS device with a precision built mirror with at least a two-axis gimbal for independently controlled rotation about two orthogonal axis. In this embodiment, the mirror may pseudorandomly project scanlines covering any screen position on the surface of screen 114. In another embodiment, scanner 110 may be a mirror with other types of directional controls, such that a scanline may be projected on every screen position on screen 114. For example, polar or cylindrical adjustments and corresponding controls may be used to point the mirror to direct the reflection of image beam to any screen position on screen 114. Because of the rotation of the mirror, a scanline projected on screen 114 may have a slight curvature instead of being a straight line. Scanner 110 may work in a color sequential mode, where the image beam sequentially varies across multiple colors and the image is reconstructed by the viewer by virtue of time integration of the various color values observed.

In another embodiment, that may be useful for highly mobile images, such as movies, a multiple-color system may be implemented using multiple primary colors simultaneously. The primary colors may be separated out by using a prism, dichroic beam splitters or dichroic mirrors, or by using separate sub-pixels with color filters. In another embodiment, a full, broad-spectrum white source may be used for illumination, and the white beam may then be split into its color components which are separately observed by multiple lines in a linear array sensor.

A particular scanline projected by the scanner 110 onto the screen 114 is not aimed, in a feed-forward fashion, at any particular predetermined position (or curve, when referring to all points on the scanline) on the screen 114. Rather, the scanline is pseudorandomly projected at some arbitrary position on the screen 114 and the arbitrary position is observed and detected by a detector, more fully described below. This feedback arrangement is generally more precise and accurate than feed-forward, because the actual position of the projected scanline on the screen is determined, instead of a predicted feed-forward position, which may be off due to many causes, such as vibration of the scanner 110 and/or the screen 114. Feedback inherently makes image correction on the screen possible, for example, to counter screen imperfections and/or vibrations, because feedback is after-the-fact observation of an event (e.g., scanline position on the screen), rather than before-the-fact prediction and/or specification of the event, as is the case in feed-forward systems.

In one embodiment, screen 114 is a typical front projection screen with a high reflexive index. In another embodiment, screen 114 is a back projection screen with diffuse transmittance for passing light through. In this embodiment, the other components shown in FIG. 1 are arranged to project the image onto the back of the screen to be viewed from front of the screen by a viewer. In another embodiment, screen 114 may be a light colored wall or any other flat surface. In yet another embodiment, screen 114 may be any surface with or without texture. The feedback feature of PSTP 100 may automatically compensate for surface imperfections, texture, and irregularities of screen 114.

In one embodiment, detector 112 is a monochrome camera. The monochrome camera detects single colors, such as red, green, or blue. Monochrome cameras may also detect IR light. A monochrome camera may be useful when the tracer beam 122 is a visible pulsed light beam. In this embodiment, the light beam pulses are of short enough duration that would be imperceptible to the human eye. In another embodiment, detector 112 may be an IR detector used to detect pulses projected by the tracer beam 122. In yet another embodiment, detector 112 may be a CCD (Charge Coupled Device) array. The CCD array may be a single row CCD array or it may be a two dimensional CCD array.

In yet another embodiment, multiple single row CCD arrays may be used. In this embodiment, a two-dimensional projected image is optically collapsed into two orthogonally related linear image components. Each of the two linear image components is detected by separate single row CCD array. This way, a target object on the projected image may be detected and tracked. In the past, a camera system constructed from specially adapted optics and sensors—could be optimized to detect and track one or more target objects, for example, dots or small bright features, in a broad field of view. With simple mirror optics a single linear array sensor is sufficient to detect both location and signal intensity of the dots in a 2D field with a minimum of computation. Positional observations can be made at very high speed with an accuracy not attainable with conventional camera systems. However, the IPD eliminates the trade-off between spatial resolution and shutter speed as observed in existing array sensors.

In still another embodiments, if a singular target object, for example, a single screen position the light level of which exceeds a pixel threshold of a detector array (for example, CCD array), a folding optics arrangements may be used to superimpose a dimension Y (for example, vertical) of an image onto a dimension X (for example, horizontal) of the image so that information contained in both dimensions may be measured and detected by a single linear CCD array. U.S. Provisional Patent application, Ser. No. 61/002,402, referenced above and to which priority is claimed and incorporated by reference, discloses this arrangement. The folding optics arrangement may be implemented using a mirror, a half-mirror (for beam splitting), or a reflecting prism, among other options. In one embodiment, pixels in the detector 112 array may have the same associated threshold. In another embodiment, pixels in the detector 112 may have a different associated threshold based on certain criteria, for example, the contrast expected in the image that will be displayed. In yet another embodiment, the pixel thresholds may be set dynamically based on certain criteria, for example, the average darkness or brightness of the image about to be displayed. The dynamic setting of the pixel thresholds may be performed during a calibration cycle of detector 112, where the pixel threshold value is set to just below the brightest value observed in the detector sensor array.

The folding optics embodiment of detector 112 enables out-of-order reporting of screen positions exceeding the pixel threshold. Additionally, this embodiment enables dimensional superposition, as more fully described below. In one embodiment, each pixel in detector 112 array may be set to a threshold. The threshold is set above the natural noise level, for example, the dark current of the electronics implementing the detector pixels. The threshold may also be set at a higher level than the natural noise level, but below the expected brightness of the target object to be detected. This way, the brightest screen position in the projected image exceeds the pixel threshold and triggers detection of the screen position. Each pixel in the detector 112 array has a predetermined address (pixel address) typically corresponding to a sequential count that can either be hard-wired or assigned during initialization of the projector system.

When a pixel in detector 112 array exceeds the threshold value, a pixel "hit" event, the address of the pixel is reported, for example to processor 116 (see FIG. 1), together with the measured light value for the corresponding screen position. For example, the data that is reported to processor 116 may take the form of a 2-tuple [Address of pixel N, Value of pixel N]. Either concurrently or afterwards, the pixel is reset, so the pixel is ready to detect the next event, for example, another screen position the brightness of which exceeds the pixel threshold. All other pixels in detector 112 array are unaffected during the detection reset cycle and pixels in detector 112 array may operate fully asynchronously. Multiple pixel hit events may be detected at the same time.

In this embodiment, no electronic or mechanical shutter may be needed for detecting pixel hit events. The pixel thresholds and resetting together act as an effective shutter mechanism for detector 112 array. An effective shutter speed of a sensor (pixel) in detector 112 an is at most as slow as the reset time of any one pixel, typically on the order of a few micro seconds or less. The shutter speed for the detection of a pixel hit event, may generally be limited by the sensitivity of a pixel trigger circuit to detect a minimum amount of charge exceeding the preset threshold value (trigger). If the value to be detected is a sufficiently bright strobe, the detection would be nearly instantaneous. For example, an avalanche photo diode detector based pixel might require as few as 30 photons to detect a hit. When high speed beam detection is required, adjacent pixels in the detector corresponding to screen positions on the scanline, may be triggered, effectively causing the detector to have little or no shutter speed limit. Furthermore, nearly simultaneous observations of different pixel hit events may be pipelined for processing to calculate and predict the trajectory of the scanline. A precise reference clock may be used to time-stamp each pixel hit event observation for accurate trajectory calculations. Such a reference clock may provide GHz (Olga Hertz; nano-second time resolution) time-stamps.

The screen position, brightness, and timestamp associated with a pixel hit even may be obtained asynchronously. Therefore, the timing of the observed pixel hit events is independent of sampling speed, sampling intervals, or shutter speed of detector 112, thus, avoiding measurement errors and quantization effects, winch typically result in image artifacts such as aliasing in traditional array sensors. Reducing quantization artifacts is an important architectural consideration. In the cases that the observed object has a known periodicity, clock accuracy and motion accuracy can be derived independently from the sensor spatial resolution, reducing motion blur. In one embodiment, the tracer beam 122 (see FIG. 1) may be pulsed with a low duty cycle, on the order of pico-seconds. Such low duty cycle IR pulses create a short-duration bright, flash and ensure that the screen position at which this bright flash appears do not spread across more than any two adjacent pixels in detector 112 array, even when the scanline sweep velocity may far exceed the spatial accuracy and shutter speed of a conventional camera.

In one embodiment, dimensional Superposition entails beam folding in addition to "deconstructing" the image, e.g., optically reducing the image dimensionally from a 2-D space, having an X- and a Y-dimension, into two or more 1-D spaces. In this embodiment an N×N image detector array may be reduced to a single N-pixel linear sensor array by "folding" and superimposing each of the two dimensions of the image onto one linear array. A 2-D image beam may be collapsed into two 1-D linear arrays using one or more cylindrical lenses that split the 2-D image beam. Beam folding may be performed by guiding the image light exiting from a cylindrical lenses onto a single linear array by optical means, for example, using mirror(s), prism(s), grating(s), or waveguide (s). In one embodiment, the single linear array may be a monochrome linear array. In another embodiment, the 2-D image may be split, resulting in two split image beams. One of the split beams may be rotated and recombined with the other split image beam, so that one cylindrical lens and corresponding sensor array may be needed.

In this embodiment, a single screen position where the IR pulse is projected on the screen, may result in two separate illuminated dots on the linear array. One dot represents X-dimension and the other dot represents the Y-dimension of the screen position on the original 2-D image. Thus, the bit values (representing, for example, brightness) and addresses of the two dots in the single linear array allow the spatial screen position in the 2-D image, as well as the intensity and color of the 2-D image corresponding to the screen position be reconstruction rapidly and efficiently, as two values have to be read from the same sensor in the single linear array. This embodiment allows the projection system to track a highly mobile bright object on the screen with N×N spatial resolution at a speed limited by the pulse width (or period) of the tracer beam. In this case, the effective resolution of the PSTP is equivalent to speed×pulse period. In one embodiment, for accurate scanline trajectory calculations, multiple sequential readings can be made as described and the result can be hyper-resolved by interpolation for scanline sweep segments with known speed and smooth curvature. This way, the PSTP scanner may achieve high resolution and great color depth, using a single monochrome array sensor.

In one embodiment, improved spatial color accuracy, for example, hue and luminance, may be independently achieved, using the same set of optics and sensors. To detect the screen position accurately based on a reflection of incident beams projected on the screen 114, a narrow band frequency light source may be used, in the form of a narrowly collimated illumination beam that illuminates a very narrow spot, for example, an IR or UV beam. If all light beams have substantially the same frequency, the optics may be optimized or tuned for this frequency. A broad spectrum light source or a mix of multiple primary color components, representing the image to be displayed, may be superimposed and projected onto the screen position to determine the hue and luminance information of the reflected image beam. To enhance the sensitivity of the color measurements, and to allow for some blurring and color aberrations inherent in using the broad spectrum light in the optics of the detector 112, values of multiple pixels in the single linear array may be combined. This may be possible because due to the laser collimation accuracy, the image information may be generally centered on the same location as the narrow beam location, which has been already determined.

In one embodiment, both the screen position an and visible image color components may be read simultaneously by subtracting IR pulse value of the screen position from sum of the adjoining "lit-up" screen positions. In another embodiment, the periodic IR pulse may be used to determine the precise scanline trajectory. The scanner may operate in color spatial field sequential fashion, where for each color, location is calculated by spatial interpolation based on the time-stamp associated with the screen position.

In one embodiment, processor 116 is a programmed microprocessor coupled to memory 118 containing the image to be displayed. As is well known to those skilled in the art, embedded programs running on the microprocessor may be used to perform appropriate signal processing using processor 116. In one embodiment, processor 116 is a digital signal processor (DSP) with specialized instructions for processing signal information. In another embodiment, processor 116 is a circuit for performing hardware-based processing and calculations. In yet another embodiment, processor 116 is a software component running on a microprocessor or microcontroller running other applications as well. Those skilled in the art would appreciate that processor 116 may be implemented using multiple processors, each processor performing a portion of the calculations needed.

In one embodiment, light source driver 102 is a circuit for modulating light sources 104 according to image control signals 124 output from the processor 116. Light source driver 102 may also process timing information $t_s$ 126 to control tracer beam generator 106. In one embodiment, light source driver 102 modulates light sources 104 and controls tracer beam generator 106. In another embodiment, light source driver 102 may be implemented as two separate modules, one for controlling light sources 14 and one for controlling tracer beam generator 106.

Not all the components shown in FIG. 1 may be required to implement PSTP 100 and variations in the arrangement and type of the components may be made without departing from the spirit or scope of the disclosure. For example, light source driver 102 and processor 116 may be integrated into one device. Conversely, light source driver 102 for modulating component light sources 104 may be a device that is distinct from processor 116. Similarly, in various embodiments, detector 112 and scanner 110 may be integrated together or may be implemented as discrete components.

In operation, with continued reference to FIG. 1, scanner 110 pseudo-randomly sweeps screen 114 with scanlines. In one embodiment, a random number generator is used to generate at least a component used to perform pseudorandom sweeps for scanner 110. In another embodiment, physical features may be used in the structure of scanner 110 to introduce pseudo-randomness in the sweep direction of the mirror employed in scanner 110. For example, irregular mechanical features, optical features, electrical currents, magnetic fields, or thermal fluctuations may be used to introduce such randomness. As scanner 110 sweeps across screen 114, the tracer beam 122 is reflected by scanner 110 and projected onto screen 114. Subsequently, tracer beam 122 is reflected back by screen 114 and is detected by detector 112. In one embodiment, tracer beam 122 is a pulsed IR beam. In another embodiment, tracer beam 122 is composed of short duration visible light pulses. Those skilled in the art will appreciate that a behavior pattern that may appear random at one level of detail may be deterministic at a more detailed level. For example, a pseudorandom behavior pattern at micro-second level of detail may be entirely deterministic at a nano-second level of detail. For instance, regular events at nano-second time resolution, when combined into longer units of time, may give rise to higher level events that appear random.

Detector 112 determines the screen position as defined by a pulse from tracer beam 122. Processor 116 predicts the subsequent screen positions based on the previous screen positions on the same scanline. The subsequent screen positions are used to obtain image pixel information from memory 118 and display on the subsequent predicted screen positions. In one embodiment, the image pixel information from memory or another image source, such as a graphic engine, may correspond to one or more screen positions. The image to be displayed may be a described as a polygonal element or continuously interpolated color mapping. This process may be continuously repeated for pulse after pulse.

For each detected pulse, the corresponding screen position information is provided to processor 116 by detector 112. In one embodiment, the screen position information may include raw data as collected by detector 112, for example, an array index of detector 112. In this embodiment, the raw data may be further processed by processor 116 to calculate the [X, Y] coordinates of the detected pulse. In another embodiment, the screen position information may include [X, Y] coordinates of the detected pulse, as determined by detector 112. Detector 112 may also provide time of detection, $t_0$, to processor 116. The time of transmission of the tracer beam from the tracer beam generator 106 to processor 116, the pulse "flight time," may be calculated by subtracting the time of generation of the pulse from the time of detection of the pulse. The pulse flight time may be used to estimate the distance of the particular point on screen 114 where the pulse was detected to scanner 110. Knowing this distance enables processor 116 to adjust the brightness and modulation of the component image beams, and tracer beam pulse frequency to compensate for a rough or irregular surface of screen 114.

In one embodiment, successive screen positions traversed by the pseudorandom scanlines, used to project combined image beam 120 onto screen 114, are looked up by high speed processor 116 in a memory reference table and the color values of the image to be displayed corresponding to the screen positions are rendered on the screen positions nearly instantaneously. Hardware graphics processors can look up such color values and any related computations at multiples of GHz (Giga Hertz, a billion cycles/second) clock speeds.

Thus, pixel color values, typically specified as 24, 32 or 48 bit color vectors, can be computed billions of times per second, with a latency of about a few nano seconds (billionths of a second). This rate of processing is more than sufficient to render the equivalent of 30 frames of two million pixels each second (60 million vectors per second). Thus, such computational speeds are more than sufficient for IPD 100 to render HDTV (High Definition TV) quality video.

In one embodiment, the projection and detection functions described above may be alternated on a small time scale, for example, on the order of a few nano-seconds. In this embodiment, in a first phase, a projection cycle is performed projecting a portion of a scanline on the screen, while a detection cycle stands by. In a second phase, the detection cycle starts while the projection cycle stands by. The first and second phases may be performed on a single or a few screen positions. In another embodiment, the projection and detection functions may operate simultaneously. For example, two sliding windows overlapping in time may be used to simultaneously project and detect multiple screen positions. One sliding window may be used for projection of an image onto multiple screen positions, while the other sliding window may be used for detection of previously projected multiple screen positions.

In its basic operation as described above, IPD 100 is independent of frames of video in contrast to conventional projectors or other display devices. In IPD, pixels on the projected image are refreshed not by an orderly scan, such as raster scan, bat by pseudorandom scan lines. As such, the limitations associated with quantization/digitization, frame rates, and the like, as described above, largely do not apply to IPD 100. For example, HDTV needs to display about 180 million dots per second for 30 frames per second of 1920 columns, 980 rows for each frame, and three colors per pixel. As a result, every pixels must be re-drawn because of the regular frame rates. This type of "overkill" is necessary to suppress some of the quantization artifacts discussed above. In contrast, IPD 100 can update a pixel using a single combined image beam 120 if the pixel is predicted to fall on the current scanline, avoiding the need to process/calculate pixels in regular sequence to get rid of artifacts.

Additionally, little or no calculations need be performed when there is a span of non-changing image value covering multiple screen positions. For example, for a solid background color the value of the image beam corresponding to screen positions falling within the solid background need be calculated once and used tens, hundreds, or thousands of times during one or more scanline sweeps. Human visual system is persistent in some respects, holding a perceived brightness or color value for a small span of time, on the order of a few microseconds. Additionally, the human visual system may integrate successive values of a pixel over time provided the refresh rate is beyond human visual perception. The result of such integration may be a perceived as a color different from all of the successively integrated values of the pixel over time. There is no concept of frame involved in the IPD, even though a sequence of image frames may also be displayed using the IPD like any sequence of images.

In one embodiment, the expected reflection of the image on the screen at a particular screen position may be compared to the actual reflection value (for example, returned color intensity of each color of the projection beam colors). A difference between an expected beam reflection value at each screen position and the actual reflection value at the same screen position is an indication of the reflection/absorption response of the screen. Thus, images prior to projection may be observed and acted upon during and after projection.

In one embodiment, the difference between the expected and the actual reflection values may be used when on-screen, location-specific references are required that allow the IPD to align and match its projection with great color and spatial accuracy to a predetermined location, color, or pattern. Thus, the projected image might complement, or alternatively mask, a reflected image. For example, a screen artifact, such as a user-interface component embedded in the screen, like a microphone or a camera lens, or a non-uniform screen area may be detected. Based on such detection, the IPD may adjust the projected image to avoid projecting the image on such screen artifacts. This feature may be useful in a video conferencing session, where the projected image of a first party in the conference needs to be properly aligned with the camera aperture embedded in the screen (which may be considered as a small irregularity in the screen surface) so that an observing second party to the video conferencing session looks directly at where the first party is looking, that is, straight into his/her eyes. If this embodiment is implemented on both sides in the video conference, the gazes and observed facial perspectives of both parties may be properly and mutually aligned. This feature enables a life-like and natural eye-to-eye contact, greatly facilitating communication between humans. In addition, due to the ability of the scanner to detect the lens aperture accurately, the sweeping projection beam can be spatially masked and can be synchronized with the shutter interval of the camera so that the camera is not blinded by the projected image.

In another embodiment, the projected image may be aligned with the projection surface, for example, in a situation where the projection surface is in motion with respect to the projector or the viewer, and the projected image needs to be angularly and/or spatially adjusted, for example, by rotation, translation, and/or scaling, to match the moving projection surface. The IPD may have high scanline projection speeds, for example about 10,000 feet per second (fps). At high projection speeds, such image adjustments may be made faster than the human eye can detect. In this embodiment, the RSPT may create an image that seems physically attached to the moving projection surface. One application of this embodiment might be the projection of advertising on moving vehicles or objects. Another application that may require precise control is an electronic dashboard display where it is desirable to align the projected image accurately with the moving/vibrating control surface, particularly if that surface has an active (for example, emissive or reflective) display that needs to be complemented by the projected image. For example, in traffic control or mission control, projecting real time flight or vehicular information on a terrain map may be possible using this embodiment.

In yet another embodiment, a white board or other collaborative surface may be used as a screen for the IPD, where written, printed, or projected images may be annotated with real, for example, erasable markers. The annotations or other markings may be superimposed on a known image that is projected onto the white board. Such markings may then be scanned in by the IPD, so the markings can be added in real-time to the image or document being projected onto the collaborative surface, and/or stored for later use or further modification. In one embodiment, the detector in IPD, for example detector 112 (see FIG. 1), may include a detection camera that can detect an image on the screen in addition to detecting the tracer beam pulses. In this embodiment, the difference between the known image projected by the IPD and the reflected image that is read back, or detected, by the detection camera may be used to determine if any additional images, such as text, lines, or physical objects like a hand or a pointer, and the like, have been projected or otherwise marked on the screen and superimposed on the known image. For example, if an image of a drawing is projected on a white board and a user writes a number or text for example, using a physical marker, on the white board, the detection camera may detect the difference between the drawing before and after the text was written by the user. Subsequently, the projected drawing may be augmented with the text written by the user on the same spot that the user wrote. In one embodiment this augmentation may be done in real-time and substantially immediately. In another embodiment, the augmentation may be done later after storage of the detected differences.

This embodiment may be particularly useful in cases where the modifications on a real white board need to be available in real-time in multiple locations in a collaborative setting. During a collaboration session, an image, such as a system diagram, may be projected on a regular white board at multiple locations using the IPD. Any modifications made to the projected diagram at any one of the locations participating in the collaboration session may be seen at all participating locations. In another embodiment, the IPD may be a rear projection system. In this embodiment, when using a "dry erase" marker on a translucent screen, the IPD may detect, from behind the screen, the ink left by the "dry erase" marker. In another embodiment, a physical object, for example, a pointing device, such as a stick or a finger, may be detected by the IPD and used to augment the projected image. For example, if a participant at one location uses a stick to point to a feature on the projected image, other participants at other locations will see an augmented image including the pointer pointing to the same feature on the image. Similarly, in an immersive video game or a virtual reality (VR) environment, physical objects, such as chairs, tables, avatars, player characters, and the like may be integrated into the scene, adding to the realism by making the VR experience more consistent with reality.

Those skilled in the art will appreciate that the same functionalities described above for IPD 100 may be implemented using other arrangements of components without departing from the spirit of the present disclosures. For example, although IPD 100 is shown and discussed with respect to a front projection arrangement, where the projected image is viewed by a user as reflected off screen 114, substantially the same concepts, components, and methods may be used for a rear projection arrangement, where the projected image is viewed on the other side of screen 114 via light transmission.
Illustrative Computing Device Environment FIG. 2 shows one embodiment of computing device 200 that may be included in a system using IPD 100. Computing device 200 may include many more or less components than those shown in FIG. 2. However, the components shown are sufficient to disclose an embodiment for practicing the present invention.

As shown in the figure, computing device 200 includes a processing unit (CPU) 222 in communication with a mass memory 230 via a bus 224. Computing device 200 also includes a power supply 226, one or more network interfaces 250, an audio interface 252 that may be configured to receive an audio input as well as to provide an audio output, a display 254, a keypad 256, a light source driver interface 258, a video interface 259, an input/output interface 260, a detector interface 262, and a global positioning systems (GPS) receiver 264. Power supply 226 provides power to computing device 200. A rechargeable or non-rechargeable battery may be used to provide power. The power may also be provided by an external power source, such as an AC adapter or a powered docking cradle that supplements and/or recharges a battery. In one embodiment, CPU 222 may be used as high performance processor 116 for processing feedback and timing information of IPD 100, as described, above with respect to FIG. 1. In another embodiment, CPU 222 may operate independently of processor 116. In yet another embodiment, CPU 222 may work in collaboration with processor 116, performing a portion of the processing used for the operation of IPD 100.

Network interface 250 includes circuitry for coupling computing device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action.

Display 254 may be a CRT, a liquid crystal display (LCD), gas plasma, light emitting diode (LED), or any other type of display used with a computing device. Display 254 may also include a touch sensitive screen arranged to receive input from an object such as a stylus or a digit from a human hand. IPD 100 may replace display 254 or work in conjunction with display 254. For example, if display 254 is an output or write-only device, that is, an output device that displays information but does not take input from the user, then IPD 100 may replace display 254. However, if display 254 is an input/output device or read/write device, then IPD 100 may work in conjunction with display 254. IPD 100 may display the output information while display 254 may take user input, for example, as a touch-screen display. This way, a user can view high quality output using IPD 100 while inputting information via the touch-screen display 254, which may additionally output the same information viewed on IPD 100. In another embodiment, described more fully below with respect to FIGS. 5 and 6, the feedback provided by IPD 100 may be used to detect user input in 3-D, integrate such input into the image being displayed, and project the integrated image onto the screen 114 in real time. This embodiment reduces or eliminates the need for display 254.

Keypad 256 may comprise any input device arranged to receive input from a user. For example, keypad 256 may include a push button numeric dial, or a keyboard. Keypad 256 may also include command buttons that are associated with selecting and sending images.

In one embodiment, a light source driver interface 258 may provide signal interface with the light source driver 102. Light source driver interface 258 may be used to provide modulation and timing control information to light source driver 102. For example, if CPU 222 is used as processor 116 for processing feedback and timing information of IPD 100, then light source driver interface 258 may be used to deliver image control 124 and timing information 126 to light source driver 102.

Video interface 259 may generally be used for providing signals of a particular type and/or formatting images for display on a particular type of display device 254. For example, if display 254 is a raster type device, such as a CRT, then video interface 259 provides the appropriate signal timing, voltage levels, H-sync, V-sync, and the like to enable the image to be displayed on display 254. If display 254 is IPD, the video interface 259 may implement some or all of the components shown in FIG. 1 to enable an image to be displayed using IPD 100.

Figure 2:
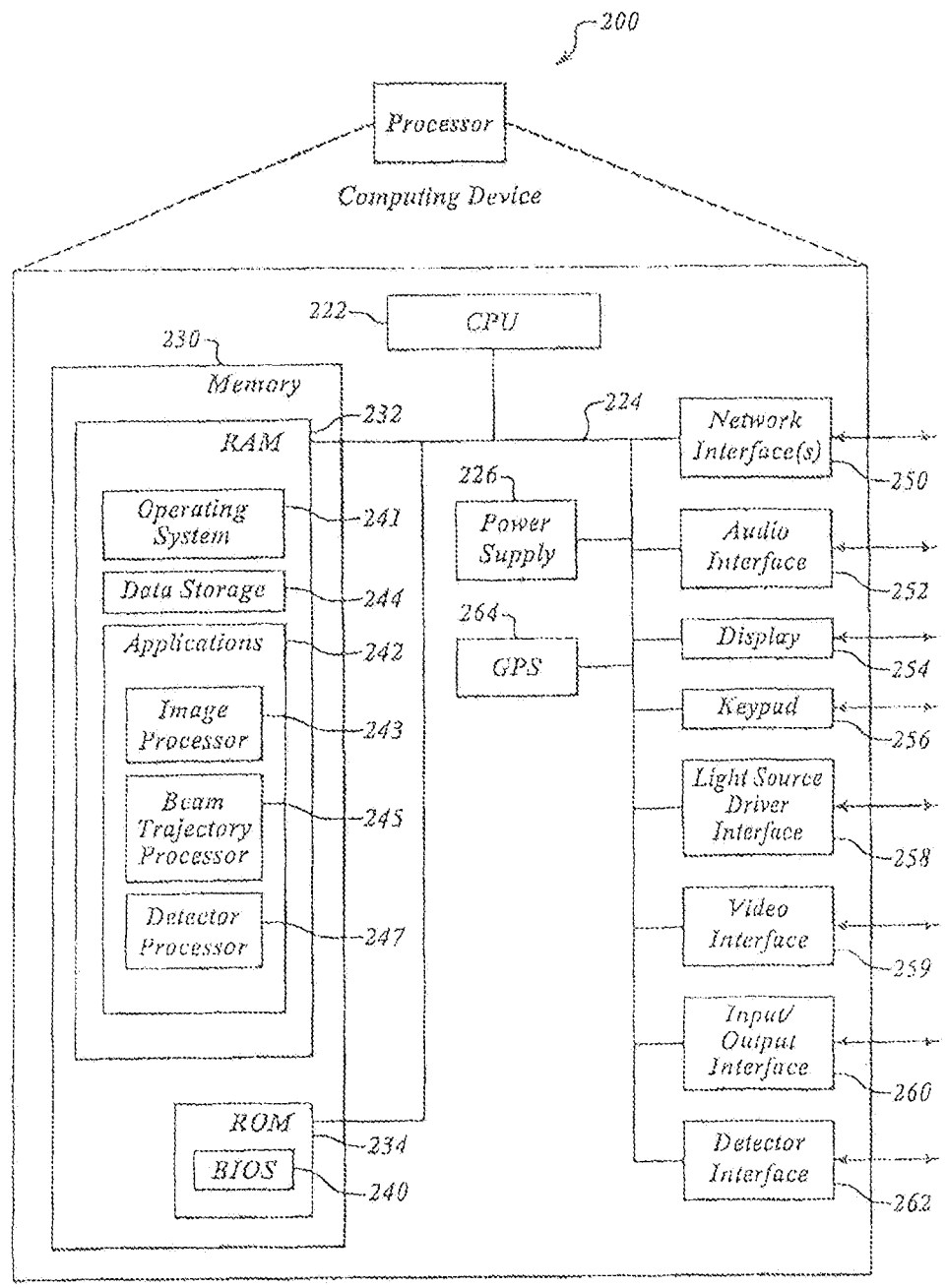
FIG. 2 shows one embodiment of a client device that may be included in a system implementing aspects of the invention.

Computing device 200 may also include input/output interface 260 for communicating with external devices, such as a headset, or other input or output devices not shown in FIG. 2. Input/output interface 260 can utilize one or more communication technologies, such as USB, infrared, Bluetooth™, or the like.

In one embodiment, detector interface 262 may be used to collect timing and screen position information from detector 112 and passing such information on to processor 116 and/or CPU 222 for further processing. In another embodiment, detector interface 262 may be integrated with video interface to 259 as one unit. In yet another embodiment, detector interface 262 may be external to computing device 200 and be part of an integrated external IPD unit.

GPS transceiver 264 can determine the physical coordinates of computing device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of computing device 200 on the surface of the Earth. It is understood that under different conditions, GPS transceiver 264 can determine a physical location within millimeters for computing device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of computing device 200. The mass memory also stores an operating system 241 for controlling the operation of computing device 200. It will be appreciated that this component may include a general purpose operating system such as a version of UNIX, or LINUX™, or a specialized computing communication operating system such as Windows Mobile™, or the Symbian® operating system. The operating system may include, or interface with a Java virtual machine module that enables control of hardware components and/or operating system operations via Java application programs. In one embodiment, mass memory 232 may be used as memory 118, for holding an image to be displayed using IPD 100, coupled with processor 116 and/or CPU 222.

Memory 230 may further include one or more data storage 244, which ran be utilized by computing device 200 to store, among other things, applications 242 and/or other data. For example, data storage 244 may also be employed to store information that describes various capabilities of computing device 200, a device identifier, and the like. The information may then be provided to another device based on any of a variety of events, including being sent as part of a header during a communication, sent upon request, or the like.

Applications 242 may include computer executable instructions which, when executed by computing device 200, transmit, receive, and/or otherwise process messages (e.g., SMS, MMS, IMS, IM, email, and/or other messages), audio, video, and enable telecommunication with another user of another computing device. Other examples of application programs include calendars, browsers, email clients, IM applications, VOIP applications, contact managers, task managers, database programs, word processing programs, security applications, spreadsheet programs, games, search programs, and so forth. Applications 242 may further include image processor 243, beam trajectory processor 245, and detector processor 247.

In one embodiment, image processor 243 is a software component that may perform functions associated with processing digital images for display using IPD 100. For example, image processor 243 may used to fetch an image to display using IPD 100 from memory 118. In one embodiment, image processor 243 works in collaboration with other components, such as video interface 259, detector interface 262, beam trajectory processor 245, and detector processor 247. Additionally, image processor 243 may be used to perform digital image processing operations on the image fetched from memory 118. For example, image processor 243 may use an adjustment coefficients matrix to adjust each color component of each image pixel of the image in memory 118 before using IPD 100 to display the image. In one embodiment multiple adjustment coefficients matrices may be used to adjust different image parameters. For example, one matrix may be used to adjust brightness, while another matrix may be used to adjust saturation when using HSB color space. In one embodiment, RGB color representation may be converted to HSB, be adjusted according to the appropriate coefficient matrices, and converted back to RGB for modulation.

Those skilled in the art will appreciate that there are many image processing operations that may be performed on an image before displaying the image. For example, various filtering operations may be performed on the image to filter out noise, sharpen edges, and improve contrast. Such image processing operations may be based on the timing of tracer beam 122 pulses, the detected view angle of a viewer, the texture of screen 114, and the like.

Beam Trajectory Processor (BTP) 245 is used to process information about the pseudo-random scanline trajectory based on tracer beam pulses 122. BTP 245 may work in cooperation with image processor 243 to estimate the next screen position for projecting the image. In one embodiment, BTP 245 collect data about N successive tracer beam 122 pulses from a current scanline being scanned by scanner 110. Next, BTP 245 uses the N successive pulses to estimate the next M display screen positions on the current scanline. For example, BTP 245 may use numerical methods to fit a curve through the [X, Y] positions of the N successive pulses and estimate/predict the next M display screen positions on the current scanline. Those skilled in the relevant arts will appreciate that there are many numerical methods that may be used for this application. For example, least squares curve fit may be used to minimize curve fit errors. Subsequently, image processor 243 fetches image pixels from memory at 118, corresponding to the M display positions on the current scanline.

In one embodiment, the screen position estimation/prediction process described above may be repeated for each tracer beam 122 pulse that is detected by detector 112. In effect, a sliding window type algorithm may be used to continuously and accurately estimate and update the predicted position of the next screen position before the scanline actually crosses the predicted screen position. In this embodiment, the width of the sliding window is the N screen positions.

In one embodiment, detector processor 247 may work in collaboration with detector interface 262 to collect and pre-process data for tracer beam 122 pulses before providing such data to BTP 245 for trajectory estimations. Those skilled in the relevant arts will appreciate that image processor 243, BTP 245, and detector processor 247 may be integrated into one component. Similarly, the functions performed by each of these components may be decomposed and distributed over other components, software or hardware, of computing device 200.

Those skilled in the relevant arts will appreciate that some of the components described above with respect to FIG. 2, for example, beam trajectory processor 245, image processor 243, and detector processor 247, may be integrated together in a single more comprehensive component that performs the functions of the individual components described. Conversely, some of the components may be decomposed and distributed over multiple smaller components with more focused functions. Additionally, some of the components described above may be implemented in hardware, software, firmware, or a combination of these.

Generalized System Operation

Figure 3:
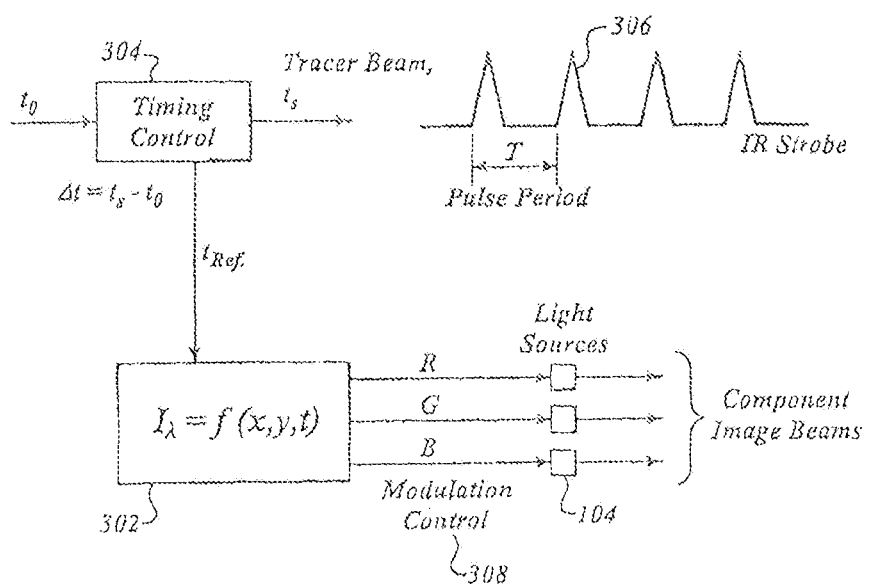
FIG. 3 shows one embodiment of a IPD control sub-system.

FIG. 3 shows one embodiment of IPD 100 control subsystem. The control subsystem takes feedback information from detector 112, processes the feedback information in conjunction with image data stored in memory 118, and provides control information to light source driver 102. In one embodiment the control subsystem includes a timing control 304 outputting a tracer beam timing and/or frequency control signal, $t_s$, and another reference timing signal, $t_{ref}$, to an intensity control component 302. The intensity control component 302 provides modulation control signals 308 for modulating component image beams generated by light sources 104.

In one embodiment, timing control component 304 is implemented as part of BTP 245 and/or a detector processor 247. In another embodiment, timing control component 304 is implemented as a separate hardware circuit that may interface with detector interface 262. Similarly, in one embodiment, intensity control component 302 may be implemented as part of image processor 243. In another embodiment, intensity control component 302 may be implemented as an independent component that is coupled with image processor 243.

In one embodiment, timing control component 304 takes as input timing information $t_0$ from to detector 112 and outputs tracer beam 122 timing information, such as $t_s$ with pulse period T between pulses 306. Tracer beam 122 timing information may subsequently be used for generating tracer beam 122 via tracer beam generator 106. Timing control component 304 may also calculate pulse flight time by subtracting $t_s$ from $t_0$. Pulse flight information may be used to calculate the distance of screen 114 from scanner 110, based on which image intensity may be controlled. Timing control 304 may also be used to vary pulse period T and thus, vary the effective resolution of the image projected using IPD 100 dynamically. Dynamic, localized, real-time variation of image resolution may be useful to adjust the displayed image on an uneven surface of screen 114. For example, if the surface of screen 114 has an edge with a sharp drop or angle, such as a wall corner with a large drop, at a given resolution, a display pixel may fall partly on the top side of the edge and partly on the bottom side of the edge, thus, splitting and distorting the displayed pixel. However, if the displayed pixel is split into two pixels by increasing local resolution dynamically, then instead of splitting the pixel over the edge, one pixel at appropriate intensity is projected on the top side of the edge and another pixel and at another appropriate intensity is projected on the bottom side of the edge.

In one embodiment, dynamic resolution adjustment in conjunction with other features of IPD, such as feedback and flight time information, may be used to project an image on several odd-shaped or angled walls surrounding the IPD for creating a visually immersive environment. Such visually immersive environment may be used in video games where the player is at the center of the room in a virtual game environment. In one embodiment, a single IPD may be used to project an image about 180° wide. In another embodiment, more than one IPD may be used to project an image about 360° wide (for example, planetarium style projection), completely surrounding a viewer.

Another application of dynamic resolution control is focusing high resolution, and thus, high quality, where high resolution is needed most. For example, an image having details of a face against a blue sky background can benefit from the high resolution for showing facial wrinkles, hair, shadows, and the like, while the blue sky background can be displayed at a relatively lower resolution without sacrificing quality significantly or noticeably.

In one embodiment, intensity control component 302 determines intensity of component image beams based on pixel values of the image in memory 118 corresponding to the next M screen positions on the current scanline. The intensity of each component image beam for each predicted screen position may be further adjusted by adjustment coefficients in an image processing matrix. In one embodiment, detector 112 includes a color camera that detects combined image beam 120 from screen 114, in addition to detecting tracer beam 122, as another feedback signal. Detected combined image beam 120 may be used to further adjust displayed image quality by comparing detected combined image beam 120 at each screen position with the corresponding image pixel in memory 118.

In one embodiment, the adjustment of the displayed image at each screen position may be done over successive scan cycles, each scan cycle sweeping a new pseudorandom scanline, of the same pixel. As scanner 110 randomly projects scanlines onto screen 114, eventually each screen position is scanned again in a later scan cycle, providing the opportunity to further adjust the color and intensity of the projected image at each screen position, or add additional detail, possibly filling in small spaces missed in the previous scan cycles, to sharpen or soften edges as needed. Due to the high scan rate of scanner 110, each display pixel is likely scanned and adjusted multiple times at a rate that is imperceptible to a human viewer. The human visual system integrates successive adjustments of color and intensity into a perceived whole by averaging the color and intensity over time if such adjustments occur fast enough for the human visual system. Thus, even if in one scan cycle, the color and intensity of a display pixel is less than perfect as compared with the corresponding pixel of the image in memory 118, for example, due to lighting and/or screen 114 surface imperfections, the color and intensity of the display pixel is adjusted in the next few scan cycles and integrated by human eye before the human vision has a chance to perceive the imperfection in one cycle.

Figure 4A:
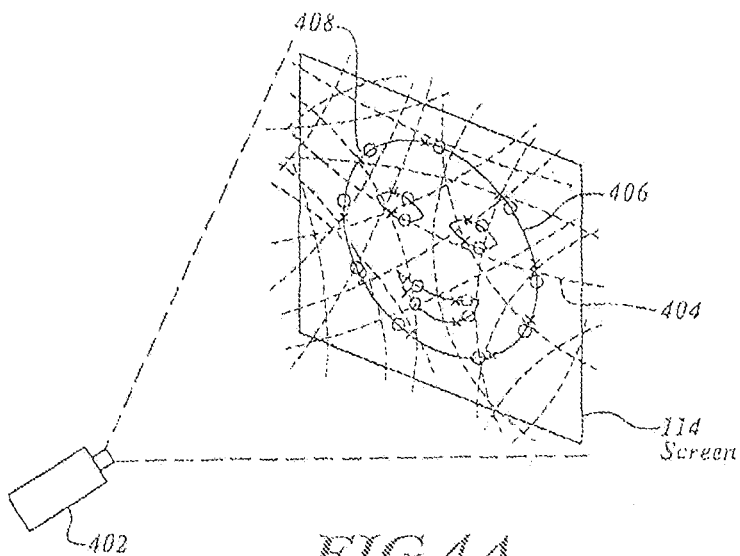
FIG. 4A shows one embodiment of light beam trajectories generated by a IPD.

FIG. 4A shows one embodiment of pseudo random beam trajectories generated by IPD 100. IPD type projector 402 is used to project pseudorandom scanlines with trajectories 404 onto screen 114. As scanline 404 trajectories randomly cover surface of screen 114 hundreds of thousands of times a second, each screen position is scanned hundreds of times per second. Each display pixel may fall on different scanlines during scanning because of the pseudorandom nature of the scanlines. For example, a pixel 408 may fall on one scanline during one scan cycle and fall on another scanline passing through the same point in another scan cycle. This is so because it is well known in basic geometry that infinitely many lines can pass through the same point in a plane, such as the surface of screen 114.

As an illustrative example, consider an image 406 of a face that is displayed using IPD 402 on screen 114. Each screen position 408 on the face 406 may fall on one or more scanlines. When screen position 408 is predicted to be the next display position on a current scanline, processor 116 (or equivalently, image processor 243 shown in FIG. 2) fetches the corresponding pixel data from the image in memory 118. The corresponding pixel data from the image in memory 118 are then used to modulate component image beams output by light sources 104 that are subsequently combined to form combined image beam 120. Combined image beam 120 is reflected by scanner 110 onto screen 114 at screen position 408 when the current scanline reaches screen position 408. This operation is typically performed on a nano-second time scale.

For relatively large spans of uniform image portions on a pixel scale, for example, a portion of blue sky or white wall, the modulation of component image beams need not change because the same color and intensities are repeated for many contiguous pixels. A Run-Length-Limited (RLL) image coding and/or display algorithm may be used to reduce the amount of processing needed to display such images. Most graphical images, such as various pictures like sceneries, clothing, faces, and the like, have large spans of uniform image colors and intensities at pixel level and can benefit from RLL based processing to increase efficiency. Even larger spans of uniformity may be encountered in synthetic game scenes and software application graphics such as desktop business applications, web pages, and the like.

Figure 4B:
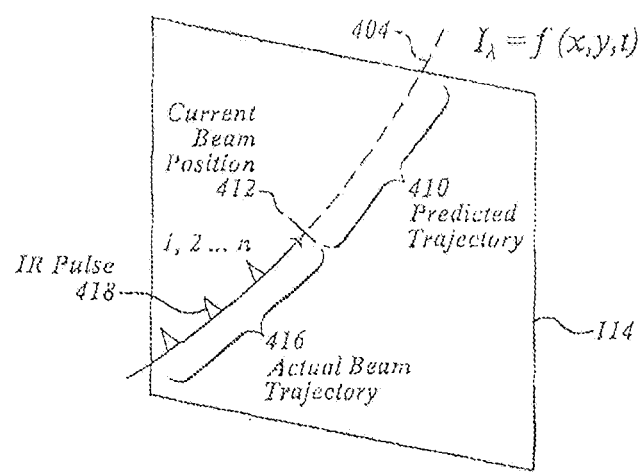
FIG. 4B shows an embodiment of one light beam trajectory with scanned and predicted trajectory portions.

FIG. 4B shows an embodiment of one pseudo random beam trajectory with scanned and predicted trajectory portions. The process of projecting an image using the IPD may be divided into two distinct phases: a feedback phase during which an already-scanned portion of scanline 404 is detected, and a projection phase during which combined image beam 120 is projected onto a predicted portion of scanline 404. Correspondingly, scanline 404 has two distinct portions, one, scanned beam trajectory portion 416, and two, predicted trajectory portion 410. Scanned beam trajectory portion 416 of scanline 404 ends at current beam position 412 and includes a sequence of pulses 414, typically generated on the basis of nano-second timing. The predicted trajectory portion 410 is the portion that is predicted by processor 116 based on the data associated with the sequence of pulses 414. The data associated with the sequence of pulses 414 include [X,Y] position of the display pixel on which pulses 414 are projected, the time at which pulses 414 are detected, and the like. In effect, pulses 414 define multiple points which specify a scanned portion 416 of scanline 404. The remaining predicted trajectory portion 410 of scanline 404 is predicted or estimated by numerical techniques, such as curve fits, based on the data associated with pulses 414. Combined image beam 120 is generally projected on predicted trajectory portion 410 of scanline 404.

Figure 5:
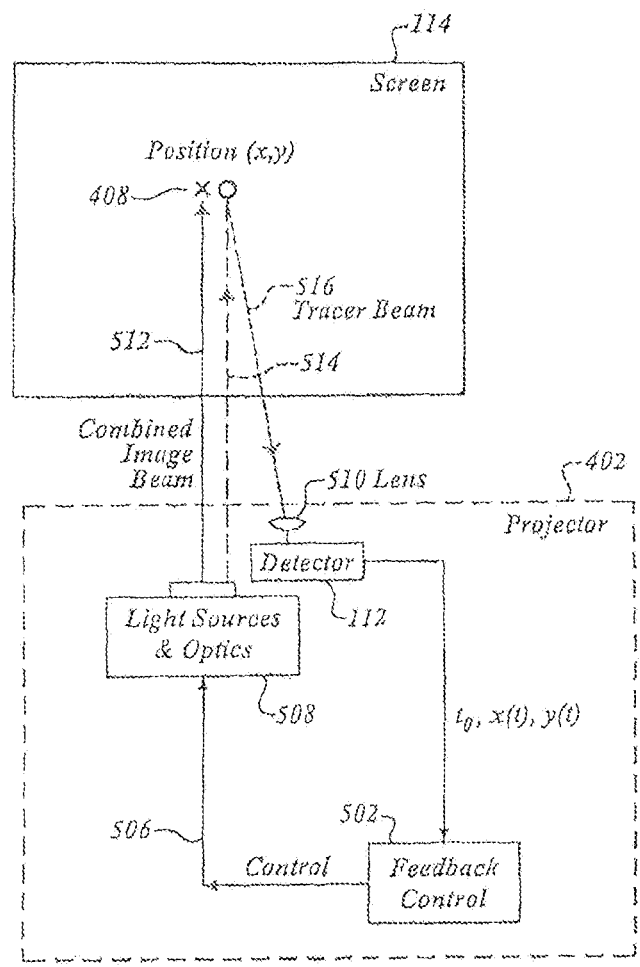
FIG. 5 shows an embodiment of a IPD depicting one image beam and tracer beam point.

FIG. 5 shows an embodiment of the IPD of FIG. 1 depicting one image beam and tracer beam point. This embodiment includes a projector 402 including a light source and optics unit 508, a detector 112 coupled with a lens 510, ad a feedback control unit 502 outputting control signals 506. A combined image beam 512 is projected onto screen 114 at screen position 408. Screen position 408 is thus defined by two light beams in close proximity: a projection X of combined image beam 120 and a projection O of tracer beam 514, in one embodiment, the tracer beam 514 includes a train of IR pulses 418 projected on screen 114 as the current scanline is swept across screen 114. In one embodiment, projection O of IR pulse 418 is co-centric with projection X of combined image beam 512. In another embodiment, projection O of IR pulse 418 is positioned side-by-side with respect to projection X of combined image beam 512. In yet another embodiment, tracer beam 514 is a short-duration, on the order of a few nano-seconds, visible light pulse, that is imperceptible to human vision because of its very short duration.

A reflection 516 of tracer beam 514 is detected by detector 112 which is generally positioned in close proximity to light sources and optics 508, for example, next to scanner 110 not shown in FIG. 5). Lens 510 may be used to collect and focus an image of reflected light 516 from screen 114 onto the sensor array, for example, a CCD array, of detector 112. In one embodiment reflected light 516 also includes a reflection of combined image beam 512 fur comparison of the displayed image with the image in memory 118 (see FIG. 1). Detector 112 provides feedback information, such as timing information $t_0$ of a pulse 414 (sec FIG. 4B), position information [X, Y], and image information, such as display pixel color and intensity data, to feedback control component 502. In one embodiment, with reference to FIGS. 1 and 2, feedback control component 502 is implemented as one or more of processor 116, CPU 222, detector interface 262, image processor 243, BTP 245, and detector processor 247.

Feedback control 502 provides control information 506 to light sources and optics component 508. Such control information include timing information $t_s$, and modulation control information 308 (see FIG. 3) to control the generation of tracer beam 514 and combined image beam 512, as more fully described above.

In one embodiment, with reference to FIGS. 1 and 2, light sources and optics component 508 may be implemented as one or more of light source driver 102, light sources 104, tracer beam generator 106, beam combiner 108, and scanner 110.

Figure 6A:
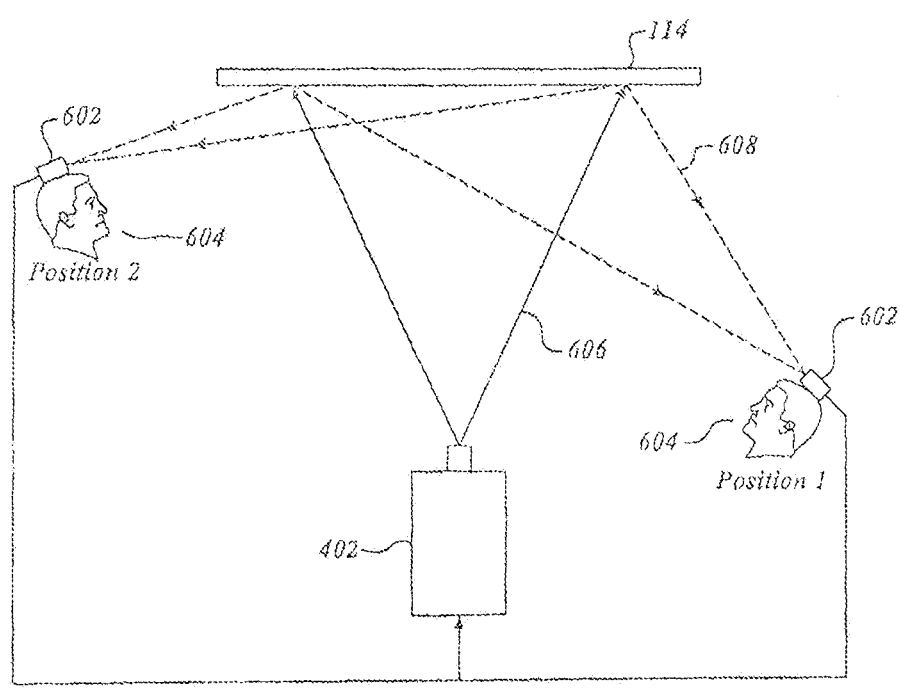
FIG. 6A shows an embodiment of an application of an IPD with different user vantage points.

FIG. 6A shows an embodiment of an application of the IPD of FIG. 1 with different user vantage points. For example, a user 604 may be at position-1, with respect to IPD 402, and later move to position-2. In one embodiment, a head-mounted or body mounted position sensor 602 may be used to provide feedback about the user 604's current position to TED 402. In one embodiment, position sensor 602 may be a position camera that can collect visual information, such as an area of focus of user 604 or other information about the image from the screen. Based on feedback that IPD 402 obtains from detector 112 (see FIG. 1) and the feedback provided by position sensor 602, processor 116 can calculate and adjust projected imaged beam 606 onto screen 114 such that reflected beam 608 observed by user 604 provides a proper perspective of the projected image to user 604. For instance, if IPD 402 is projecting an image of a ear viewed from front when user 604 is viewing screen 114 from a vantage point along the direction of projection, then user 604 sees a front view of the car. Now, if user 604 moves to position-1 to the right of IPD 402, then IPD 402 calculates the new viewing angle for position-1 and projects the right-side perspective of the car image for user 604. Similarly, if user 604 moves to position-2 to the left of TED 402, then IPD 402 calculates the new viewing angle for position-2 and projects the left-side perspective of the car image for user 604.

As described for FIG. 6A, this capability is useful in immersive applications, for example, video games, where user perspective can be dynamically and in real-time updated and projected. Additionally, in one embodiment, each eye can be treated as a separate point of view with different left and right depth perceptions. In this case, eyewear with separate shutters for each eye could be used to control the image viewed by each eye. Alternatively, polarization of lens in front of each eye could be employed to control the image viewed by each eye.

Figure 6B:
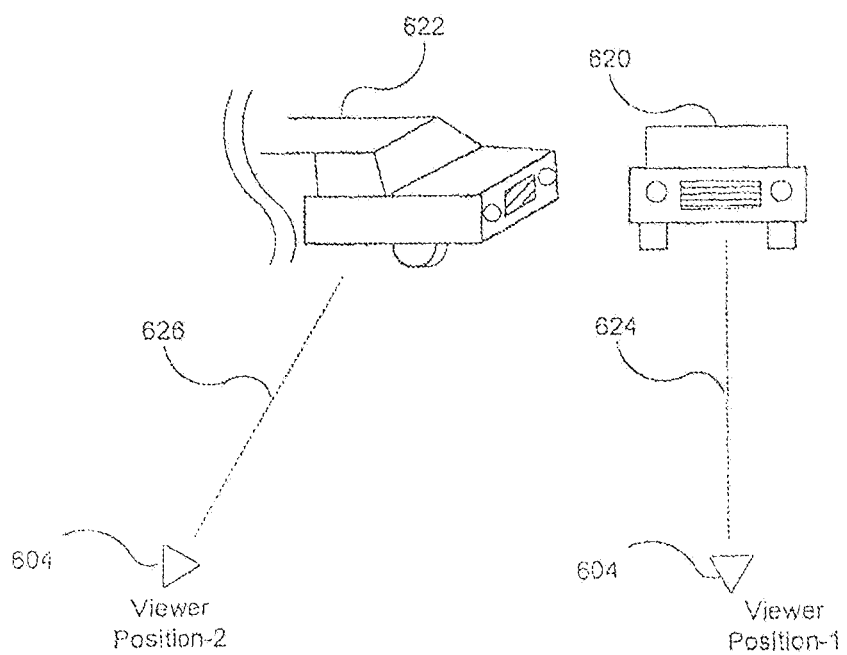
FIG. 6B shows an embodiment of an IPD response to different viewing perspectives.

FIG. 6B shows an embodiment of a IPD response to different viewing perspectives. In this embodiment, an illustrative image of a car is projected by the IPD onto a screen. When user 604 is at position-1, with a line of sight 624, which is substantially perpendicular to the screen, that is, substantially parallel with a center-line of projection from the IPD to the screen, a front-view image 620 of the car is automatically projected by the IPD. The position of user 604, in this case, position-1, relative to the center-line of projection is determined by information communicated via position sensor 602 (see FIG. 6A). When user 604 changes his position to position-2, with a line of sight 626, which is at an angle with respect to the center-line of projection, that is, not parallel with the center-line, the IPD detects the new position via information provided by position sensor 602. Subsequently, the IPD adjusts the image of the car to project the correct perspective image 622 of the car on the screen, as if user 604 is looking at a physical car in real world in 3-D. This embodiment enables projection of images in an immersive environment, such as video games, virtual reality applications like moving in and around an object, car, or building, and the like.

In one embodiment, the feedback and image adjustment mechanisms of IPD may be used in an interactive virtual and/or augmented reality (VAR) system for interaction with user 604. In this embodiment, when user 604 approaches a projected object on the screen, the IPD may provide many VAR capabilities, such as "zooming in," revealing ever greater detail about the projected object from the correct perspective, "zooming out," "panning left/right," "panning up/down," handling a projected object, for example, lifting or pushing, and most other interactions that may be performed on a real object. Furthermore, since few or no physical constraints exist in a VAR system, some interactions that cannot be performed with a physical object may be performed on a projected object. For example, user 604 may walk through a wall without breaking the wall, as light passing through glass. A "zoom factor" may determine the rate of magnification as a function of the distance between user 604 and the projected object. User 604 may approach any object in view on the screen. The zoom factor may depend on the relative distance and desired realism in the VAR system. These features may create enhanced depth & motion experience.

In one embodiment, the IPD renders a scene by continuous real-time adjustments of the projected image by referencing the image as viewed through a position camera aligned with the viewer's perspective, as described above with respect to FIGS. 6A and 6B. In one embodiment, the position camera may be focused on a field of view within the screen, representing a focus area of the viewer/user. For example, if the screen has the image of a football match, and the position camera is focused on a subarea of the screen, where the ball is located, then that subarea is the field of view. In one embodiment, the position camera may be mounted on goggles such that the direction of the gaze of the viewer/user determines the field of view seen by the position camera, which is subsequently fed back to the IPD.

The position feedback and independence of quantization allows the IPD to render objects in great detail, relatively unconstrained by any fixed resolution. By concentrating the graphics subsystem computational resources, such as memory and processing power, on, the rendering of graphics polygons describing the projected object, more detailed objects may be rendered. The system resources are more efficiently used because the field of view may be rendered with greater detail than a peripheral field, while still a sufficiently realistic peripheral vision experience is maintained. The peripheral field may be rendered in less detail, or with greater latency (for example, due to a lower processing priority), conserving computational resources such as memory and computing bandwidth.

As discussed above, the distance of the viewer/user to the projected surface may be determined by detecting the tracer beam and determining the flight time of the tracer beam pulses. A total viewer distance, $D_T$ to an object is the sum of a real distance, $D_R$, and an imaginary distance, $D_1$: $D_T = D_R + D_1$. $D_R$ is the distance from the viewer (for example, the viewer's eyes) to the position on the screen where the object is projected. $D_1$ is the distance of the object away from and behind the plane represented by the projection surface (for example, screen), measured along the direction of view. For example, in a video game or VAR environment, a game engine may control $D_1$ by the varying size, shading, and rendering of perceivable details appropriately. $D_T$, may also be referred to as a radial distance (total perceived distance), that is the distance from the object in view to the viewer's eye measured radially, that is, along the direction of view. In addition to this radial distance, a correct angular perspective may also be determined, as discussed above.

Objects that can be rendered and viewed in different directions and angular positions may he limited by the screen geometry and the position of the viewer. In case of a standard single rectangular projection surface (for example, normal front or rear projection system configurations) the limiting factors are screen height and width, and the viewing distance. If projection is done on walls surrounding the viewer, little or no geometric limitations may exist for the field of view of the user and interactions with objects projected onto the screen. Apart from screen imitations imposed by geometry or physical configuration, the viewer, equipped with the position camera, may move freely about the screen and approach any object in his field of view, which is usually a limited subset of, a "view cone," within the total possible field of view. When the viewer approaches the screen the objects in his view will tend to naturally increase in size because the viewer is getting closer to them. As the image on the screen gets bigger, the image also occupies a grater portion of the field of view of the viewer. Accordingly, the viewer expects to see more details about the object, just as in real world.

At this point certain problems may occur that are best illustrated with an example. In an illustrative example, the viewer is looking at a static outdoor scene including a mountain about 10 miles away, some trees, and some rocks. Without any image adjustments by IPD, as the viewer moves closer to the screen, the distance of the viewer to an object, for example, a tree, is reduced exactly proportionally to the real distance traversed by the viewer towards the screen. Thus as the viewer approaches a far away object, for example, the mountain 10 mile away in the view, the mountain will appear to come much closer than it should. For example, if the viewer travels three feet, half the distance of six feet from his original position to the screen, be will see the mountain twice as dose even though be has not actually traveled five miles (half the perceived distance to the mountain). Even though this change in perceived distance is art expected artifact in a static image, it immediately tells the viewer's brain that the mountain is actually just a number of pixels projected on a flat surface six feet away, and not a real mountain 10 miles away. Thus, as the viewer comes closer to the screen, his natural depth perception is violated by every object in the scene, except possibly those objects that are perceived as close to the screen in the foreground.

Additionally, without image adjustment, all objects in the projected view may have unaltered geometric positions fixed to the projection surface, which is clearly not what would happen in reality. Furthermore, in the far background, the horizon does not recede, as it does in the real world, but comes 50% closer as the viewer moves three feet. In real world, as the user walks towards a mountain in the distance and approaches closer objects, the angular positions of objects with respect to the viewer's field of view generally increase for all objects in the view, more for closer objects, and less for farther objects.

Furthermore, without image adjustment, details that were hard to see at some distance, for example a tree that was 15 feet away, are still hard to see, when the viewer gets three feet closer. So, getting closer has less effect than expected. Also, as the viewer gets closer to the screen, serious projection and display limitations become visible due to an excessively coarse image rendering granularity and pixel pitch and other quantization artifacts that destroy the "suspension of disbelief".

The above visual faults may be more acute in a VAR environment. The visual faults that result from lack of proper adjustment to the projected image when the viewer moves with respect to the screen result in the loss of the carefully constructed illusion, which so critical to a full immersive experience.

The IPD provides the capability to properly adjust the projected images, static, dynamic, or interactive, like VAR and video game environments, with respect to the viewer's position and field of view, to provide a realistic visual experience. Continuing with the illustrative example above, the viewer standing six feet away from the screen, may see in the center of the field of view a far away object, for example, the mountain. As the viewer moves half the distance to the screen—three feet—the system detects the viewer's motion and adjusts the screen size of the mountain correctly to half size, canceling the effect of the viewer moving 50% closer to the screen. The mountain is seen by the viewer as unaltered, as be would also see in real world, since the mountain is still approximately 10 miles away (less three feet) but the image is viewed from half the original distance to the screen. Without detecting the viewer's position, the mountain's apparent size would have doubled, as discussed above.

At the same time, a small bush in the foreground is left unaltered by the IPD since the viewer's motion in fact results in the real distance to that bush being halved and the unaltered projected image should look twice as big, at half the distance, precisely as it would if it were a real bush. Additionally, since the bush is now quite close, a system using the IPD, for example the VAR system, allocates some extra graphics resources to render more visible details in each leaf of the bush, and the like, to render a closer view of the bush, since the user is now closer and expects to see more detail. This is made possible by the dynamic resolution control feature of the IPD. Possibly, as the viewer gets very close, the system may actually project a shadow of the viewer over the bush. Such rendering would further enhance the realism experienced by the viewer. The realism is further supported by the IPD due to substantial lack of fixed pixel size, pixel position, pixel orientation, or scan patterns. The IPD may render and display all objects in view in the natural looking detail with few or no obvious visual artifacts. An important point to note is that the IPD is independent of a game controller, buttons, or keys to adjust the image. The IPD may adjust the image automatically based on the position camera and the field of view of the viewer.

Figure 6C:
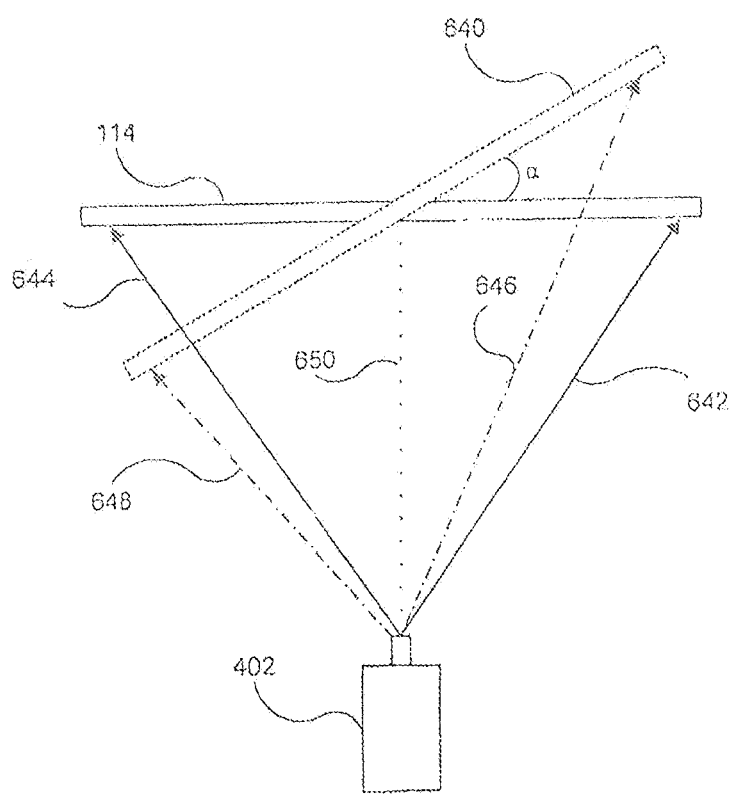
FIG. 6C shows an embodiment of a IPD projection onto a tilted screen.

FIG. 6C shows an embodiment of a IPD projection onto a tilted screen. IPD 402 may project an image onto screen 114 when centerline 650 of projection is substantially perpendicular to the surface of screen 114. In this configuration, symmetrical projection lines 642 and 644 are substantially equal in length due to the symmetry of projection with respect to screen 114. In one embodiment, IPD 402 may project the image onto screen 640 having an angle not perpendicular to centerline 650. In this configuration, asymmetrical projection lines 646 and 648 are substantially different in length due to the asymmetrical configuration of screen 640 with respect to IPD 402. Because asymmetrical projection lines 646 and 648 have different lengths, the flight time of tracer beam pulses 418 (see FIG. 4B) will be different when the tracer beam is projected along the asymmetrical projection line 646 than when the tracer beam is projected along the asymmetrical projection line 648. This difference in flight time may be detected by the IPD and used to adjust the projected image and avoid image distortion due to a "stretching" effect of a tilted screen.

The stretching effect is caused by geometric projection of a line segment onto a plane having an angle α with respect to the line segment. The length of the projected line segment, $L_p = L/\cos\alpha$, where L is the length of the line segment. In this case, $L_p > L$, causing the stretching of the line segment. Similarly, any other shape projected on a tilted screen is also stretched by the same factor of $1/\cos\alpha$. The same adjustments done for tilted screen 640 may be applied to a projection surface with small surface irregularities and/or angles, such as a fabric with wrinkles or angled walls, in a piece-wise fashion. This ability of IPD to use the tracer beam feedback and automatically adjust the projected image in real-time enables projection of images onto uneven and irregular surfaces with substantially reduced or eliminated distortions.

Figure 7A:
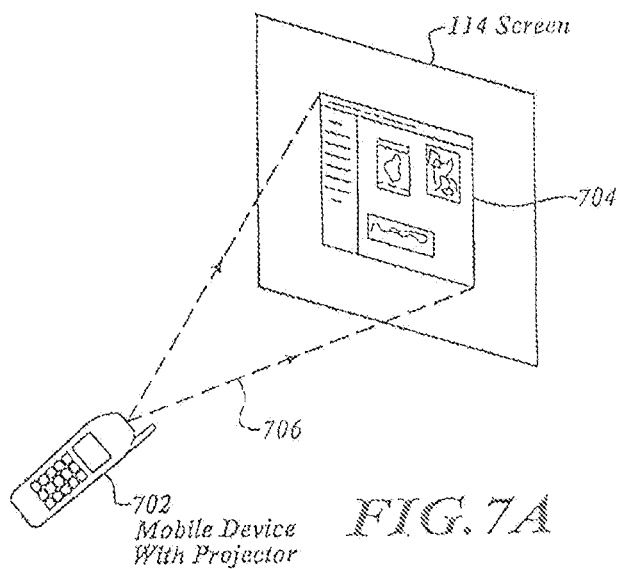
FIG. 7A shows an embodiment of a mobile device with an embedded IPD.

FIG. 7A shows an embodiment of a mobile device with an embedded IPD. Mobile device 702 may be any of a variety of mobile computing devices, such as mobile phones, PDA's, laptop PC's, and the like. The operation of IPD is similar to that described above. Because IPD technology is small by nature, using miniaturized solid state components such as LED light sources 104, MEMS (Micro Electronic and Mechanical Systems), such as scanner 110 (see FIG. 1), processor 116, and the like, and the actual screen, such as screen 114, where the image is projected is generally external to IPD 100, IPD is suitable for housing in small physical computing devices with little or no loss of screen size and/or displayed image quality. One limitation of small mobile computing devices is availability of sufficient power to run light sources for high intensity projection. In one embodiment, an AC power adapter may be used to provide additional electrical power for brighter or longer duration projections using mobile device 702. Software applications that need high quality GUI on modern mobile devices and can benefit from the IPD technology include electronic mail (e-mail), video games, mobile web pages, and the like. The outputs of such software applications may be displayed using a IPD as a projected image 704, instead of using the generally small and low resolution screens available on such devices.

Figure 7B:
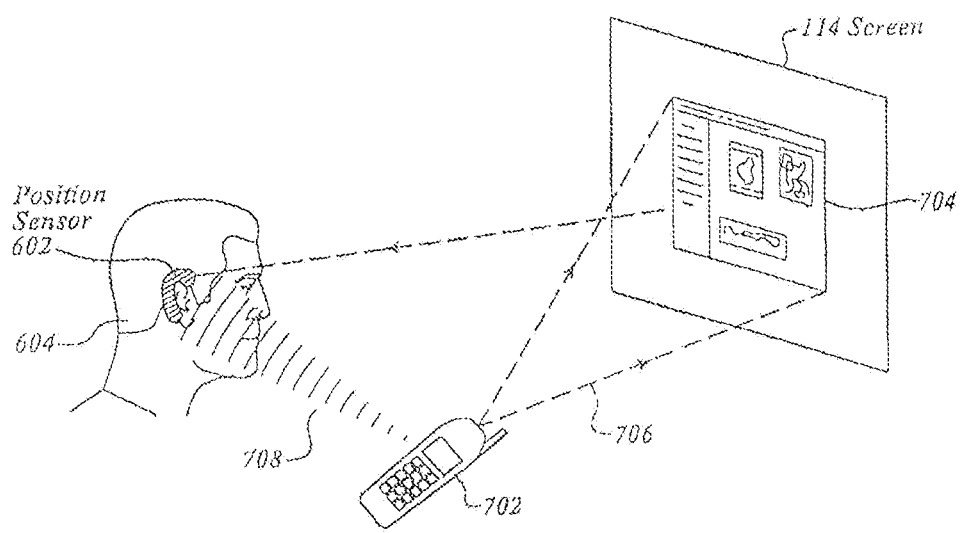
FIG. 7B shows another embodiment of a mobile device with an embedded IPD and a head-mounted position sensor.

FIG. 7B shows another embodiment of a mobile device with an embedded IPD and a head-mounted position sensor.

In one embodiment, position sensor 602, shown in FIG. 6, may be implemented as an ear-mounted device that communicates wirelessly with the IPD embedded in mobile computing device 702 to provide wireless position feedback 708 to the IPD, as described above with respect to FIG. 6. Displayed image perspective is adjusted as user 604 moves around with respect to screen 114 and/or mobile device 702 when set in a stationary position.

Figure 8A:
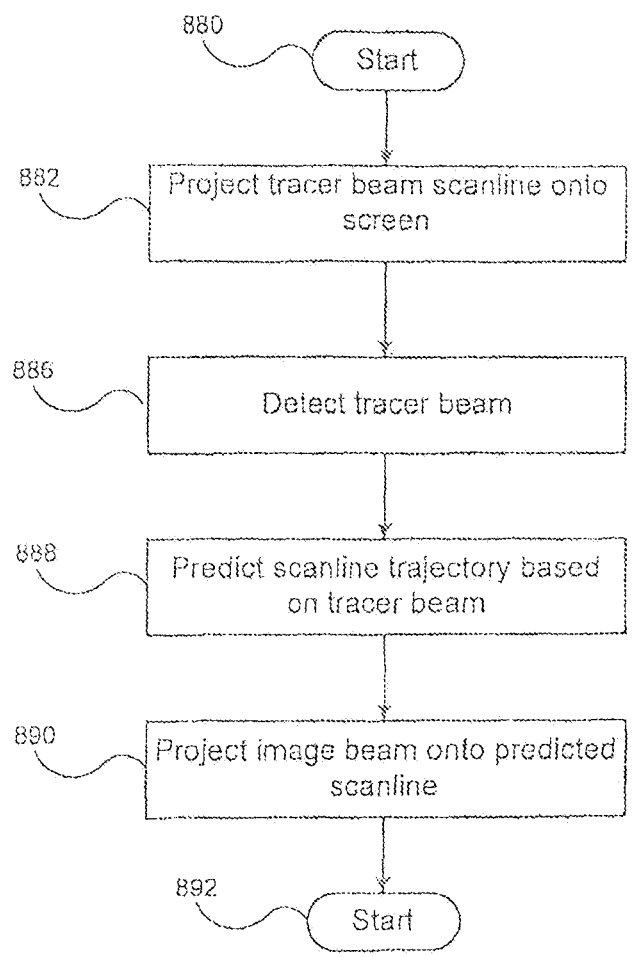
FIG. 8A shows a flow diagram of one embodiment of a high level process of generating an image using a IPD.

FIG. 8A shows a flow diagram of one embodiment of a high level process of generating an image using a IPD. The process starts at block 880 and proceeds to block 882 where a tracer beam is projected onto a projection screen along a pseudorandom scanline trajectory. As described above, the tracer beam may include intense, short-duration light pulses, such as IR pulses, that may be imperceptible to human vision but may be easily detected by a detector. The process moves to block 886.

At block 886, the tracer beam is detected. Various detection schemes may be used that detect the screen position of each pulse on the pseudorandom scanline, such as 2-D CCD arrays, beam-folding optical detectors, and the like. Several screen positions corresponding to the tracer beam pulses are detected. In one embodiment, a sliding window with a width of N screen positions may be used to detect the tracer beam. The N screen positions may subsequently be used to predict the trajectory of the scanline. The process proceeds to block 888.

At block 888, a portion of the scanline trajectory that is not yet projected by the IPD is predicted based on the N screen positions detected at block 886. For example, a curve fit algorithm may be used to extrapolate and determine the next M screen positions on the scanline. The process proceeds onto block 890.

At block 890, stored image pixels or generated graphics corresponding to the next M screen positions are obtained from an image source, such as from memory coupled with the IPD. The correspondence of image pixels with the next M screen positions are not necessarily one-to-one. For example, one image pixel may cover and correspond to multiple screen positions, depending on the resolution of the image to be displayed. The obtained image is then projected by the IPD onto one or more of the M screen positions. In one embodiment, the next M screen positions are determined on a continuous basis, for example, using another sliding window with a width of M. The process terminates at block 892. Additional process details are described below with respect to FIG. 8B.

Figure 8B:
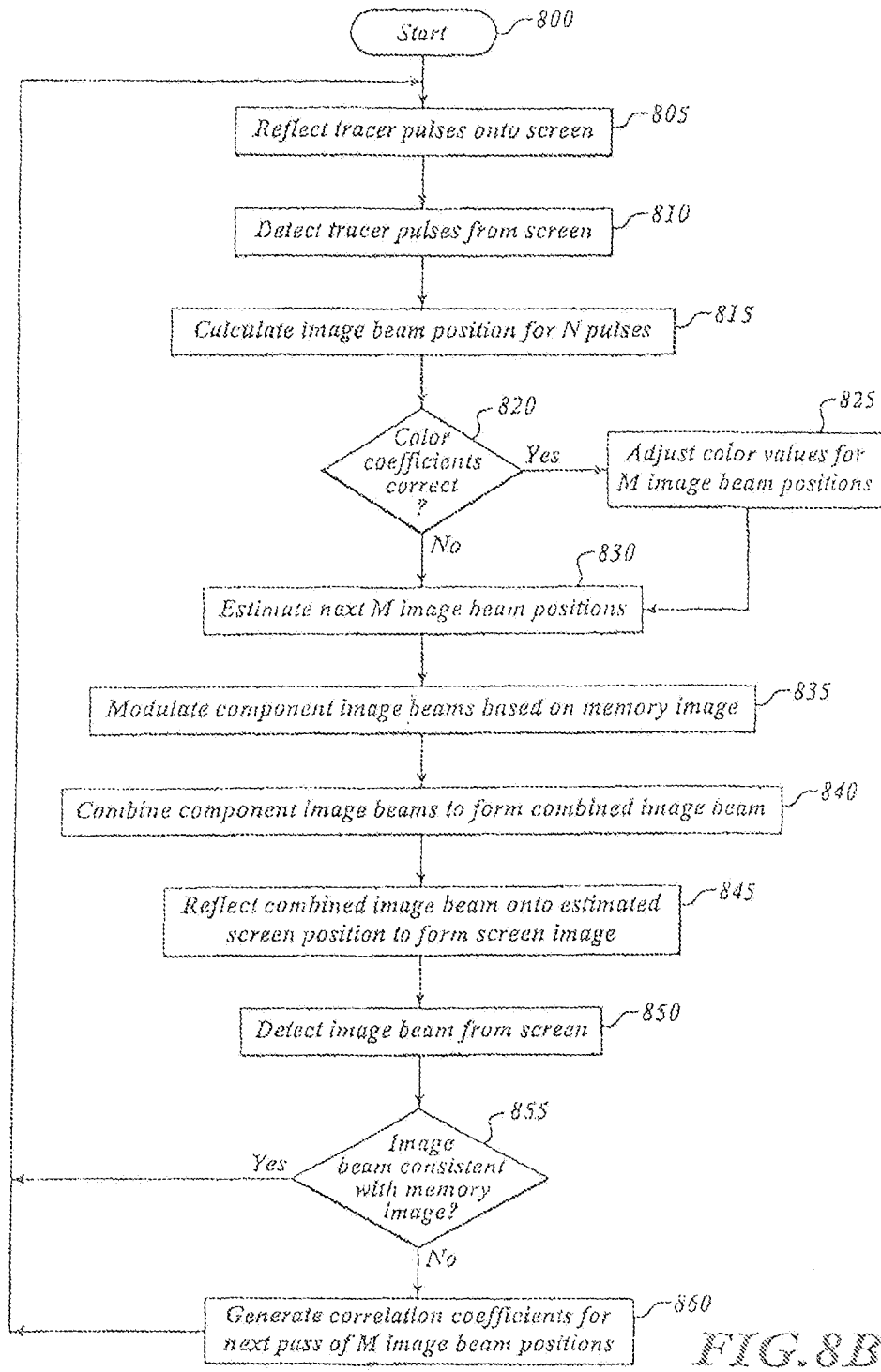
FIG. 8B shows a flow diagram of one embodiment of a detailed process of generating an image with a IPD.

FIG. 8B shows a flow diagram of one embodiment of a process of generating an image with the IPD of FIG. 1. With reference to FIGS. 1 and 8, the overall process of generating an image using a IPD starts at block 800 and proceeds to block 805 where tracer beam 122 pulses are projected onto screen 114. As discussed above, tracer beam 122 may be IR pulses that are projected in parallel with combined image beam 120 onto screen 114 and subsequently detected by detector 112. Tracer beam 122 is used to predict the next screen position on the current scan line being swept across screen 114 by scanner 110. The process proceeds to block 810.

At block 810, detector 112 is used to detect tracer beam 122 pulses, and provide the raw data and/or preprocessed data associated with the pulses to processor 116. In one embodiment, a sliding window algorithm is utilized to collected data about the N preceding pulses corresponding with the N preceding screen positions. The process proceeds to block 815.

At block 815, processor 116 calculates the trajectory of the current scan line to predict and/or estimate the next screen position on the current scanline for display of image pixel from memory 118. In one embodiment, next M screen positions are predicted based on the N preceding tracer beam 122 pulses on the current scanline. In one embodiment, the determination/prediction of the next M screen positions is repeated for each of the M pixels as the current scanline sweep continues by the scanner 110, thus implementing a sliding window algorithm both at the feedback end where data are collected about N preceding pulses and at the prediction end where M next screen positions are predicted. The sliding window at the feedback end is N pulses wide while the sliding window at the prediction end is M pixels wide. The process moves on to decision block 820.

At decision block 820, the process determines whether adjustment coefficients are updated and whether pixel color values, such as intensity or saturation, need adjustment before display. If so, the process proceeds to block 825 where the pixel values obtained from memory 118 are adjusted using the adjustment coefficients before proceeding to block 830. Otherwise, the process proceeds directly to block 830.

At block 830, the next M screen positions on the current scanline are determined. As noted above, in one embodiment, the next M screen positions are predicted based on dual sliding windows, one at the feedback end where data about preceding N screen positions are collected, and one at the prediction end where each of the next M screen positions are determined based on the data collected about the preceding N screen positions. The process proceeds to block 835.

At block 835, component image beams outputted by light sources 104 are modulated according to the corresponding values of color components of the pixels of image in memory 118, where the pixels correspond to the next screen position on the current scanline predicted at block 830. For example, the intensity of the R (Red) component image beam may be set to the red component value of the image in memory 118 for the pixel to be displayed next on the current scanline. The process proceeds to block 840.

At block 840, the component image beams, for example, RGB components, are combined together to form one combined image beam 120. In one embodiment, a prism may be used to combine the component image beam. In other embodiments other methods currently known in the art or methods to be discovered in the future may be used to combine the component image beams. The process proceeds to block 845.

At block 845, a scanner 110, for example a MEMS device, with a rotating mirror with two degrees of rotational freedom, for example, two orthogonal planes of rotation, reflects the combined image beam 120 as pseudorandom scanlines sweeping across screen 114. Different methods may be used to inject randomness into the direction of the scanlines from one scan cycle to the next. These methods range from mechanical and physical means, such as imprecisely controlled off-center vibrations at microscopic level, to electronic and software means, such as random number generators. The process proceeds to block 850.

At block 850, detector 112 or another image detection camera optionally detects the reflection of combined image beam 120 from screen 114. In one embodiment, combined image beam 120 is scattered off screen 114 and is refocused onto detector 112, or the other image detection camera, using a lens 510 (see FIG. 5). Data collected about projected pixel values and positions are used to improve the projected pixel values (the image) on the next scan cycle. The process proceeds to decision block 855.

At decision block 855, the data collected about projected pixel values are compared with the corresponding pixel value of the image stored in memory 118 to determine any deviations. If any deviations are detected, for example, because of screen 114 color or texture, adjustment coefficients for the pixel values of the image in memory 118 are updated at block 860 to adjust such pixel values for the next scan cycle. Otherwise, the process proceeds to block 805 and the process is repeated for the next screen position on the current scanline. As one scanline is completed, another scanline is started and the same process described above is repeated with respect to the new scanline.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A device for projecting and scanning, comprising:
    a tracer beam generator that is arranged to project a tracer beam on a surface such that a tracer beam spot is formed on the surface, and such that a position of the tracer beam spot relative to the surface changes over time;
    a scanner that is arranged to project a beam on the surface such that an illuminated spot is formed on the surface, such that a position of the illuminated spot relative to the surface changes over time, and such that there is a correlation between the position of the illuminated spot and the position of the tracer beam spot that is constant over time;
    detection components that are arranged to detect a location of the tracer beam spot by detecting a reflection of the tracer beam, such that the detected location includes a set of coordinates that define the location of the tracer beam spot relative to the surface, wherein the detection components are further arranged to provide location information based on the detected location at different times, and wherein the detection components are further arranged to receive a portion of light reflected from the illuminated spot, and to measure the color intensity of the illuminated spot at different times; and
    a processor that is configured to determine, from the location information, a scan line trajectory of the tracer beam across the surface, and further configured to match the color intensity measurements with positions along the scan line trajectory.

\* \* \* \* \*

UNITED STATES PATENT AND TRADEMARK OFFICE
CERTIFICATE OF CORRECTION

PATENT NO.       : 8,430,512 B2
APPLICATION NO.  : 13/605948
DATED            : April 30, 2013
INVENTOR(S)      : Gerard Dirk Smits It is certified that error appears in the above-identified patent and that said Letters Patent is hereby corrected as shown below:

In the Drawings

In Fig. 8A, Sheet 10 of 11, for Tag "892", delete "Start" and insert -- End --, therefor.

In the Specification

In Column 1, Line 55, delete "sonic" and insert -- some --, therefor.

In Column 2, Lines 8-9, delete "MicroElectroMechanicalSystems (MEMS)" and insert -- Micro Electro Mechanical Systems (MEMS) --, therefor.

In Column 2, Line 12, delete "effect" and insert -- affect --, therefor.

In Column 2, Line 26, delete "a Image" and insert -- an Image --, therefor.

In Column 2, Lines 34, 37, 43, 51, 53, delete "a IPD" and insert -- an IPD --, therefor at each occurrence throughout the specification.

In Column 2, Line 55, delete "DESCRIPTION" and insert -- DETAILED DESCRIPTION --, therefor.

In Column 3, Line 31, delete "many-to-one," and insert -- many-to-one --, therefor.

In Column 3, Line 39, delete "that one" and insert -- than one --, therefor.

In Column 4, Line 18, delete "fight" and insert -- light --, therefor.

In Column 6, Line 29, delete "PDAs," and insert -- PDA's --, therefor.

Signed and Sealed this
Twentieth Day of May, 2014

Michelle K. Lee
*Deputy Director of the United States Patent and Trademark Office*

CERTIFICATE OF CORRECTION (continued)
U.S. Pat. No. 8,430,512 B2

In Column 6, Line 36, delete "place of" and insert -- place of, --, therefor.

In Column 7, Lines 3-4, delete "Standard Generalized Markup Language (SMGL)," and insert -- Standard Generalized Markup Language (SGML), --, therefor.

In Column 7, Line 33, delete "dining" and insert -- during --, therefor.

In Column 8, Line 1, delete "abasing," and insert -- aliasing, --, therefor.

In Column 9, Line 19, delete "Process 116" and insert -- Processor 116 --, therefor.

In Column 9, Line 27, delete "lasers, in" and insert -- lasers. In --, therefor.

In Column 11, Line 56, delete "an" and insert -- array --, therefor.

In Column 12, Line 7, delete "(Olga Hertz;" and insert -- (Giga Hertz; --, therefor.

In Column 12, Line 15, delete "winch" and insert -- which --, therefor.

In Column 15, Line 29, delete "bat" and insert -- but --, therefor.

In Column 15, Line 29, delete "scan lines." and insert -- scanlines. --, therefor.

In Column 17, Line 4, delete "text" and insert -- text, --, therefor.

In Column 17, Line 9, delete "embodiment" and insert -- embodiment, --, therefor.

In Column 17, Line 55, delete "processing unit (CPU)" and insert -- central processing unit (CPU) --, therefor.

In Column 18, Line 3, delete "described," and insert -- described --, therefor.

In Column 19, Line 56, delete "mass memory 232" and insert -- mass memory 230 --, therefor.

In Column 19, Line 60, delete "ran" and insert -- can --, therefor.

In Column 21, Line 30, delete "embodiment" and insert -- embodiment, --, therefor.

In Column 24, Line 3, delete "514, in" and insert -- 514. In --, therefor.

In Column 24, Line 17, delete "110 not" and insert -- 110 (not --, therefor.

In Column 24, Line 22, delete "fur" and insert -- for --, therefor.

In Column 24, Line 48, delete "TED 402." and insert -- IPD 402. --, therefor.

CERTIFICATE OF CORRECTION (continued)
U.S. Pat. No. 8,430,512 B2

In Column 24, Line 58, delete "ear" and insert -- car --, therefor.

In Column 24, Line 65, delete "TED 402," and insert -- IPD 402, --, therefor.

In Column 26, Line 5, delete "on," and insert -- on --, therefor.

In Column 26, Line 34, delete "he" and insert -- be --, therefor.

In Column 26, Line 42, delete "imitations" and insert -- limitations --, therefor.

In Column 26, Line 50, delete "grater" and insert -- greater --, therefor.

In Column 26, Line 65, delete "be" and insert -- he --, therefor.

In Column 26, Line 65, delete "dose" and insert -- close --, therefor.

In Column 26, Line 66, delete "be" and insert -- he --, therefor.

In Column 27, Line 1, delete "art" and insert -- an --, therefor.

In Column 27, Line 47, delete "be" and insert -- he --, therefor.

In Column 30, Line 34, delete "set" and insert -- sent --, therefor.

In the Claims

In Column 32, Line 16, in Claim 1, delete "beam" and insert -- light beam --, therefor.